(12) United States Patent
Ashraf et al.

(10) Patent No.: US 12,192,856 B2
(45) Date of Patent: Jan. 7, 2025

(54) LINK ADAPTATION FOR SIDELINK GROUPCAST

(71) Applicant: Telefonaktiebolaget LM Ericsson (publ), Stockholm (SE)

(72) Inventors: Shehzad Ali Ashraf, Aachen (DE); Wanlu Sun, San Diego, CA (US); Hieu Do, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 433 days.

(21) Appl. No.: 17/421,496

(22) PCT Filed: Dec. 18, 2019

(86) PCT No.: PCT/EP2019/085919
§ 371 (c)(1),
(2) Date: Jul. 8, 2021

(87) PCT Pub. No.: WO2020/144024
PCT Pub. Date: Jul. 16, 2020

(65) Prior Publication Data
US 2022/0086602 A1    Mar. 17, 2022

Related U.S. Application Data

(60) Provisional application No. 62/790,535, filed on Jan. 10, 2019.

(51) Int. Cl.
*H04W 4/06* (2009.01)
*H04W 4/44* (2018.01)
(Continued)

(52) U.S. Cl.
CPC ............... *H04W 4/06* (2013.01); *H04W 4/44* (2018.02); *H04W 4/46* (2018.02); *H04W 76/14* (2018.02); *H04W 76/40* (2018.02); *H04W 76/23* (2018.02)

(58) Field of Classification Search
CPC ...... H04W 4/06; H04W 4/08; H04W 4/30–48
See application file for complete search history.

(56) References Cited

U.S. PATENT DOCUMENTS

2016/0056940 A1    2/2016  Chae et al.
2018/0026755 A1*   1/2018  Meng .................... H04L 1/1829
                                                                370/429
(Continued)

FOREIGN PATENT DOCUMENTS

WO    WO-2017171616 A1 * 10/2017 ............... H04L 1/00
WO    WO 2018/048273 A1    3/2018
(Continued)

OTHER PUBLICATIONS

International Search Report and Written Opinion for International Application No. PCT/EP2019/085919 dated Jun. 17, 2020, 25 pages.
(Continued)

*Primary Examiner* — San Htun
(74) *Attorney, Agent, or Firm* — Sage Patent Group

(57) ABSTRACT

Methods, computer programs and receiving wireless devices for operating a receiving wireless device associated with a group are provided, wherein the group includes the receiving wireless device and a transmitting wireless device. The method includes receiving a groupcast data packet from the transmitting wireless device of the group. The method further includes determining a distance of the receiving wireless device from the transmitting wireless device. The method further includes selecting a communication resource for one of an Acknowledgement, ACK, message or Negative Acknowledgement, NACK, message for the groupcast data packet, wherein the communication resource is selected based on the distance from the transmitting wireless device. The method further includes transmitting the one of the ACK message or NACK message for the groupcast data
(Continued)

packet using the communication resource selected based on the distance from the transmitting wireless device.

20 Claims, 19 Drawing Sheets

(51) Int. Cl.
*H04W 4/46* (2018.01)
*H04W 76/14* (2018.01)
*H04W 76/40* (2018.01)
*H04W 76/23* (2018.01)

(56) References Cited

U.S. PATENT DOCUMENTS

| | | | | |
|---|---|---|---|---|
| 2018/0069664 | A1* | 3/2018 | Khoryaev | H04L 1/1621 |
| 2018/0254872 | A1 | 9/2018 | Seo et al. | |
| 2019/0052436 | A1* | 2/2019 | Desai | H04L 5/0055 |
| 2019/0132104 | A1* | 5/2019 | Lee | H04L 1/1664 |
| 2020/0106566 | A1* | 4/2020 | Yeo | H04L 1/1854 |
| 2020/0112862 | A1* | 4/2020 | Lee | G08G 1/096716 |
| 2020/0145799 | A1* | 5/2020 | Baghel | H04L 1/0018 |

FOREIGN PATENT DOCUMENTS

| | | |
|---|---|---|
| WO | WO 2018/164450 A1 | 9/2018 |
| WO | WO 2020/006729 A1 | 1/2020 |
| WO | WO 2020/068973 A1 | 4/2020 |
| WO | WO 2020/091683 A1 | 5/2020 |

OTHER PUBLICATIONS

Qualcomm Incorporated, "Design aspects and requirements for QoS", 3GPP TSG RAN WG1 Meeting #95, Spokane, USA, Nov. 12-16, 2018, R1-1813427, 6 pages.

Qualcomm Incorporated, "Considerations on Physical Layer aspects of NR V2X", 3GPP TSG RAN WG1 Meeting #95 Spokane, USA, Nov. 12-16, 2018, R1-1813421, 16 pages.

* cited by examiner

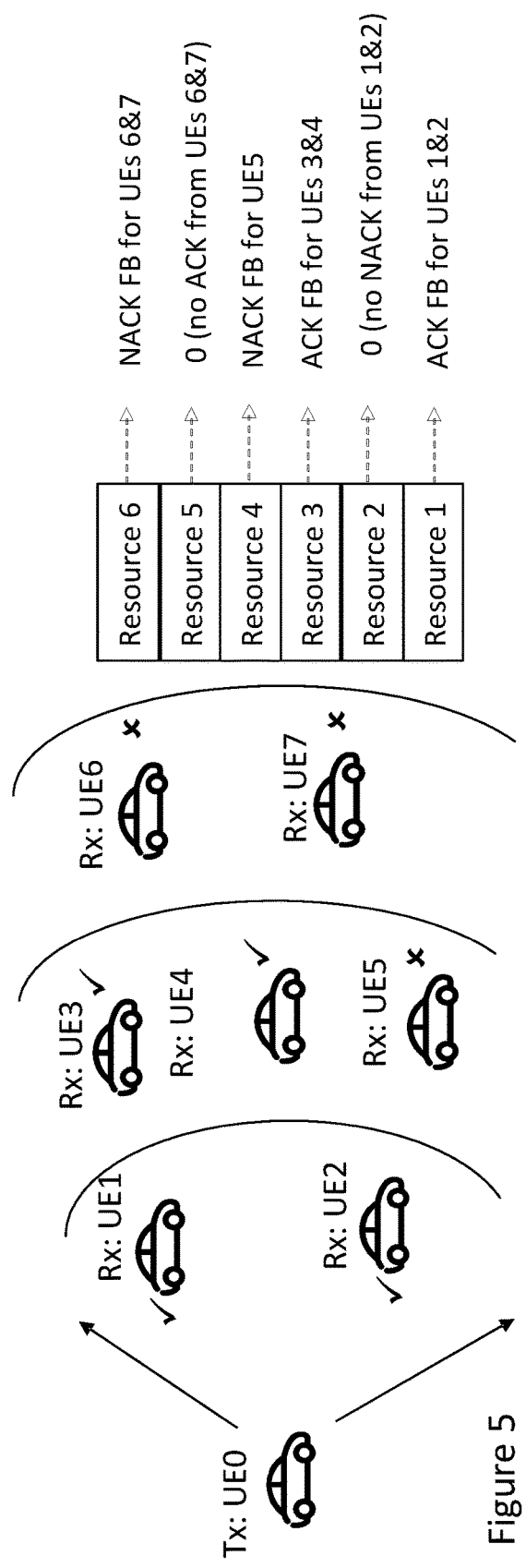
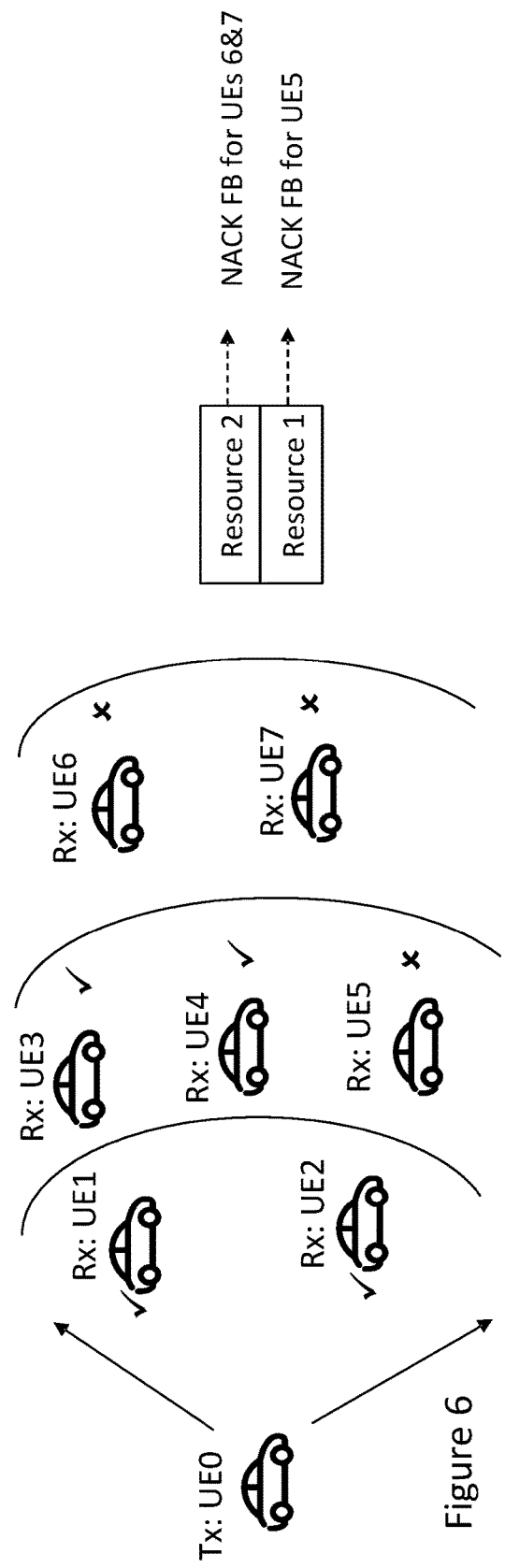
Figure 5
Figure 6

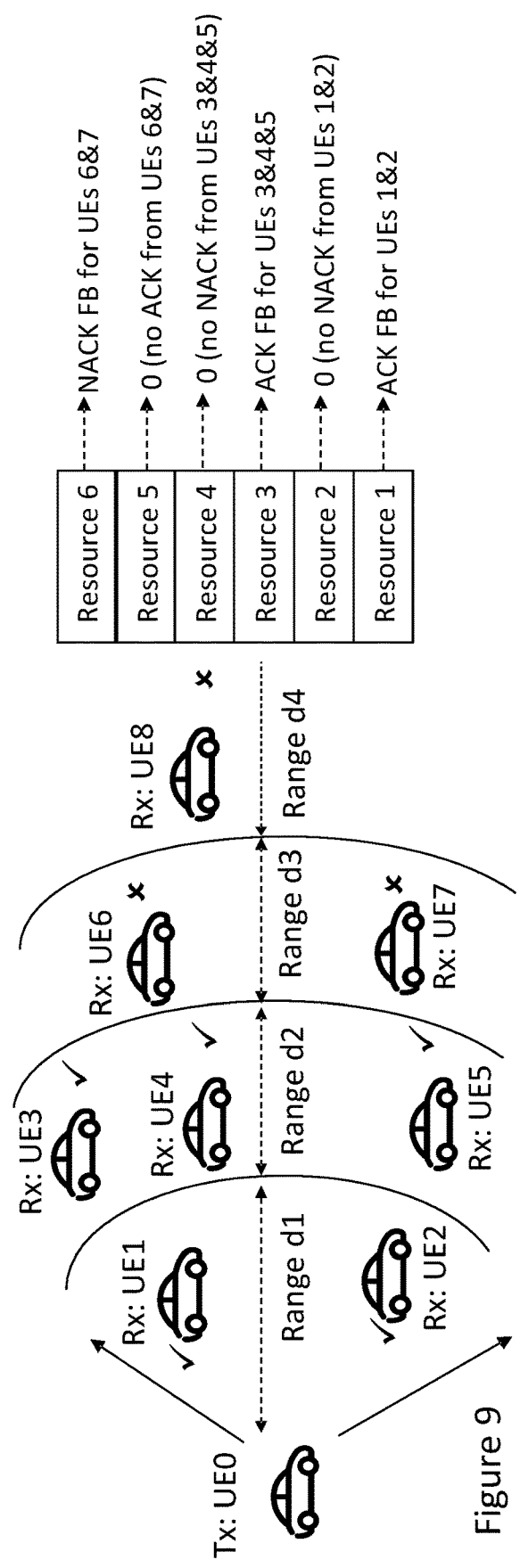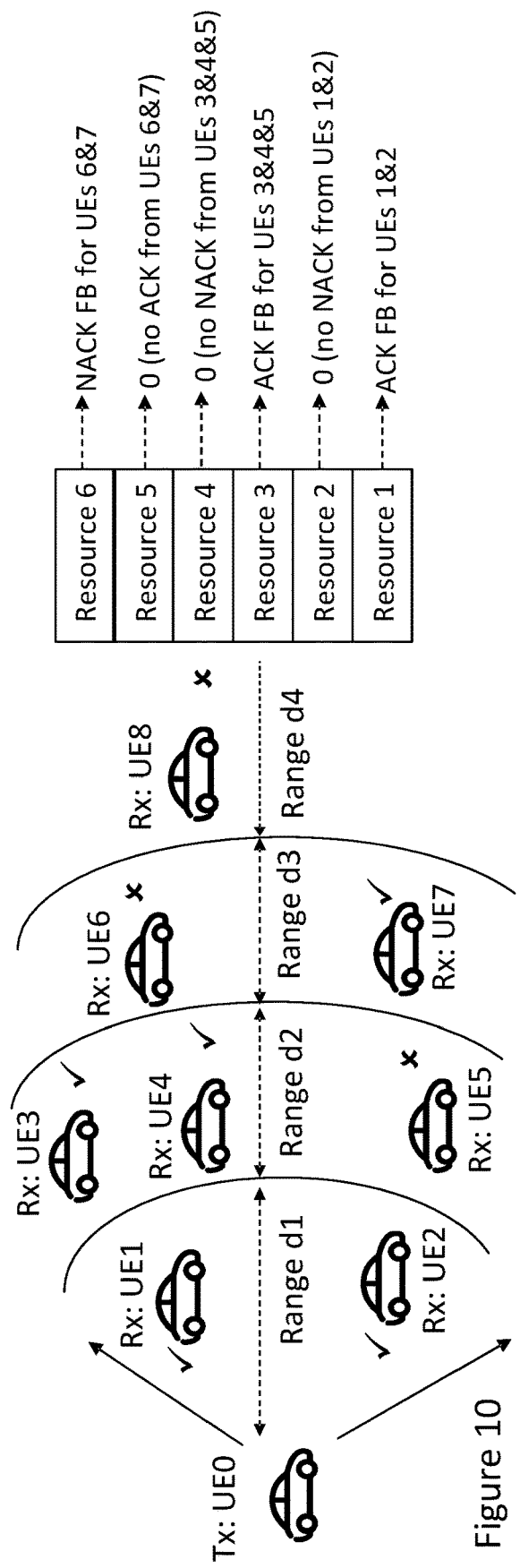
Figure 9
Figure 10

LINK ADAPTATION FOR SIDELINK GROUPCAST

CROSS REFERENCE TO RELATED APPLICATIONS

This application is a 35 U.S.C. § 371 national stage application of PCT International Application No. PCT/EP/2019/085919 filed on Dec. 18, 2019, which in turn claims priority to U.S. Provisional Application No. 62/790,535 filed on Jan. 10, 2019, the disclosures and content of which are incorporated by reference herein in their entireties.

The present disclosure relates generally to communications, and more particularly, to wireless communications and related wireless communication devices and network nodes.

LTE V2X (Vehicle to anything) communication was first specified by 3GPP in Release 14, and some advancements have been specified in Release 15. LTE V2X includes new features and enhancements that allow for vehicular communications. One of the most relevant aspects is the introduction of direct vehicle-to-vehicle (V2V) communication functionalities. The specifications support other types of vehicle-to-anything (V2X) communications, including V2P (vehicle-to-pedestrian or pedestrian-to-vehicle), V2I (vehicle-to-infrastructure), etc., as shown in FIG. 1.

FIG. 1 illustrates V2X scenarios for an LTE-based Radio Access Network NW. As shown in FIG. 1, V2I (vehicle-to-infrastructure) communications may be provided between a vehicle and the radio access network RAN (e.g., between UE-1 and eNB or between UE-2 and eNB), V2V (vehicle-to-vehicle) communications may be provided directly between different vehicles (e.g., between UE-1 and UE-3, or between UE-2 and UE-3) without communicating through the radio access network, and V2P (vehicle-to-pedestrian or pedestrian-to-vehicle) communications may be provided directly between a vehicle and a device held/carried by the pedestrian (e.g., a smartphone, a tablet computer, etc.). V2X communications are meant to include any/all of V2I, V2P, and V2V communications.

These direct communication functionalities are built upon Long Term Evolution LTE Device-to-Device D2D communications (also known as ProSe or Proximity Services), as first specified in the Release 12 of LTE, and may include enhancements targeting the specific characteristics of vehicular communications. For example, LTE V2X operation may be possible with and without network coverage and with varying degrees of interaction between the UEs (user equipment) and the NW (network), including support for standalone, network-less operation.

LTE V2X mainly targets basic road safety use cases, such as, forward collision warning, emergency braking, road-works warning, etc. Vehicle UEs supporting V2X applications can exchange their own status information (such as position, speed and heading) with other nearby vehicles, infrastructure nodes and/or pedestrians. Typical messages sent by the vehicles may include Co-operative Awareness Messages (CAMs) and Decentralized Environmental Notification Messages (DENMs), defined by ETSI, or Basic Safety Messages (BSMs), defined by the SAE (Society of the Automotive Engineers).

3GPP has started a new study item (SI) in August 2018 within the scope of Rel-16 to develop a New Radio (NR) version of V2X communications. The NR V2X may target advanced V2X services, which can be categorized into four use case groups: vehicle platooning, extended sensors, advanced driving, and remote driving. The advanced V2X services may require enhanced NR system and new NR sidelink to meet stringent requirements in terms of latency and reliability. NR V2X systems may also be expected to provide higher system capacity and/or better coverage and to allow for extension to support future development of further advanced V2X services and other services.

To support advanced V2X services, 3GPP defines five categories of requirements and five level of automations to better group various V2X service requirements, which are characterized by:
Payload (Bytes);
Transmission rate (Message/Sec);
Maximum end-to-end latency (ms);
Reliability (%);
Data rate (Mbps);
Minimum required communication range (meters).

3GPP systems, including both Uu and sidelink (SL) interfaces, are expected to fulfil the required key performance indicators (KPIs). Among these requirements, minimum required communication range is not coved by the current 5G Quality of Service (QoS) framework, since it is particular for V2X services.

Due to the nature of basic road safety services, technical solutions for LTE V2X Rel-14/15 may be designed mainly for broadcast transmissions. That means that the intended receiver of each message is all the UEs within a relevant distance from the transmitter. In physical layer broadcast communications, the transmitter, in fact, may not have the notion of intended receivers.

Given the targeted services of NR V2X, it is recognized that groupcast (also referred to as multicast) transmissions and unicast transmissions may be desired, in which the intended receiver of a message includes only a subset of the vehicles in proximity to the transmitter (groupcast) or of a single vehicle (unicast). In a platooning service, for example, there may be certain messages that are only of interest to the members of the platoon, making the members of the platoon a natural groupcast. In other examples, the see-through use case may involve only a pair of vehicles, for which unicast transmissions may naturally fit.

With such V2X groupcast messages, conventional acknowledgements (ACK/NACK) may consume increased radio resources.

SUMMARY

LTE sidelink V2X targets only broadcast scenario. In this case, since the transmitter is not aware of its target receivers, there are no feedback and link adaptation features. For sidelink groupcasts, there are two approaches to support sidelink groupcast, each with its own limitations. For example, treating sidelink groupcast in the same way as sidelink broadcast provides no feedback from the receivers to the transmitter and no link adaptation, leading to low spectral efficiency. Another approach is treating sidelink groupcast as multiple independent unicast connections, where each individual UE in the group is considered as one unicast receiver. This approach may use conventional feedback link adaptation, and power control mechanisms of the Uu interface (uplink and downlink in cellular networks) to each unicast connection, but scales with the square of the number of UEs, leading to consumption of more radio resources when transmitting messages and sending feedback.

According to some embodiments of inventive concepts, a method may be provided in operating a receiving wireless device associated with a group that includes the receiving wireless device and a transmitting wireless device. A groupcast data packet may be received from the transmitting wireless device of the group. A distance of the receiving wireless device from the transmitting wireless device may be determined. A communication resource may be selected for one of an Acknowledgement, ACK, message or Negative Acknowledgement, NACK, message for the groupcast data packet. The communication resource may be selected based on the distance from the transmitting wireless device. The one of the ACK message or NACK message for the groupcast data packet may be transmitted using the communication resource selected based on the distance from the transmitting wireless device.

One advantage that may be provided in some embodiments of inventive concepts is that ACK and/or NACK feedback based link adaptation, power control and/or retransmission for sidelink groupcast is enabled, potentially taking into account the communication range requirement of sidelink transmissions. Thus, link adaptation and/or power control that is enabled for sidelink V2X groupcast may increase spectrum efficiency and reduce interference to unwanted receivers by making use of the communication range, which may be a requirement for V2X, for sidelink design.

According to some other embodiments of inventive concepts, a method may be provided in operating a transmitting wireless device associated with a group that includes the transmitting wireless device and a plurality of other wireless devices. A groupcast data packet may be transmitted to the plurality of other wireless devices of the group. A power/energy of at least one acknowledgment, ACK, message and/or negative acknowledgement, NACK, message received in response to the groupcast data packet may be determined. A transmission may be determined based on the power/energy of the at least one ACK message and/or NACK message.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIG. 5 illustrates ACK and NACK feedbacks on different resources depending on receiver locations according to some embodiments of inventive concepts;

FIG. 6 illustrates pure NACK feedback on different resources depending on receiver locations according to some embodiments of inventive concepts;

FIG. 9 illustrates ACK and NACK feedback on different communication resources depending on different distance ranges with respect to the transmitter according to some embodiments of inventive concepts;

FIG. 10 illustrates ACK and NACK feedback on different communication resources depending on different distance ranges with respect to the transmitter according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 11:
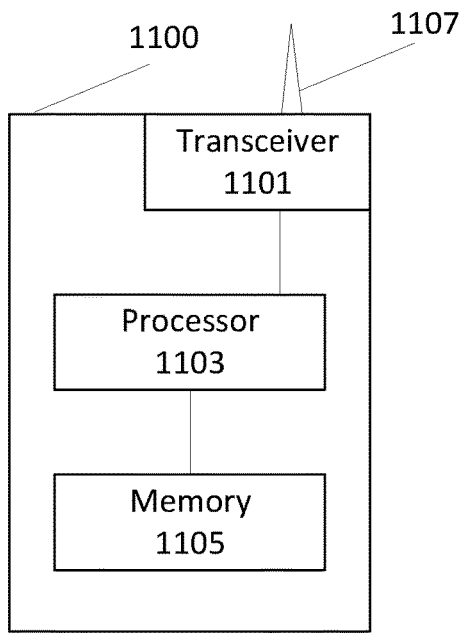
FIG. 11 is a block diagram illustrating a wireless communication device UE according to some embodiments of inventive concepts.

FIG. 11 is a block diagram illustrating elements of a wireless device 1100 (also referred to as a wireless communication device, a wireless terminal, a wireless communication terminal, user equipment, UE, or a user equipment node/terminal/device) configured to provide V2X sidelink communication according to embodiments of inventive concepts. As shown, wireless device 1100 may include a transceiver circuit 1101 (also referred to as a transceiver) including a transmitter and a receiver configured to provide uplink and downlink radio communications with a base station of a radio access network, and to provide V2X sidelink communications (e.g., V2V and/or V2P communications) directly with other V2X wireless communication devices. Wireless device 1100 may also include a processor circuit 1103 (also referred to as a processor) coupled to the transceiver circuit, and a memory circuit 1105 (also referred to as memory) coupled to the processor circuit. The memory circuit 1105 may include computer readable program code that when executed by the processor circuit 1103 causes the processor circuit to perform operations according to embodiments disclosed herein. According to other embodiments, processor circuit 1103 may be defined to include memory so that a separate memory circuit is not required. Wireless device 1100 may also include an interface (such as a user interface) coupled with processor 1103, and/or wireless device 1100 may be incorporated in a vehicle.

As discussed herein, operations of wireless device 1100 may be performed by processor 1103 and/or transceiver 1101. For example, processor 1103 may control transceiver 1101 to transmit communications through transceiver 1101 over a radio interface to another wireless device and/or to receive communications through transceiver 1101 from another wireless device over a radio interface. In addition, processor 1103 may control transceiver 1101 to receive communications through transceiver 1101 from Radio Access Network base station (e.g., an eNodeB/eNB or gNodeB/gNB). Moreover, modules may be stored in memory 1105, and these modules may provide instructions so that when instructions of a module are executed by processor 1103, processor 1103 performs respective operations (e.g., operations discussed below with respect to Example Embodiments 1-62 and/or one or more of FIGS. 4-17).

Figure 12:
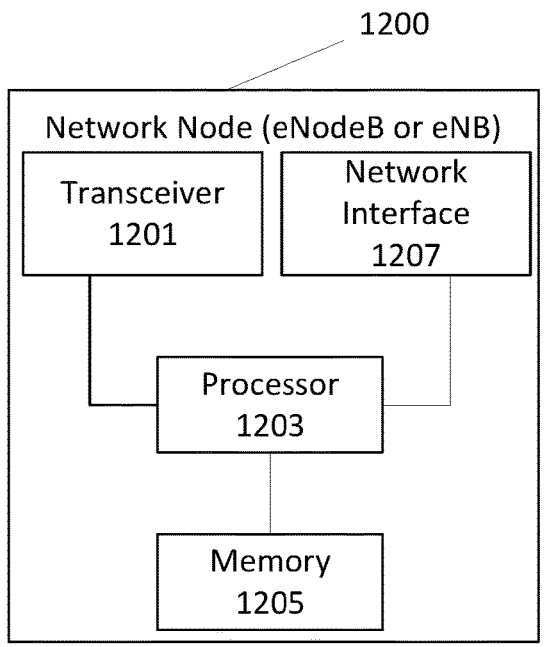
FIG. 12 is a block diagram illustrating a network node according to some embodiments of inventive concepts.
Figure 13:
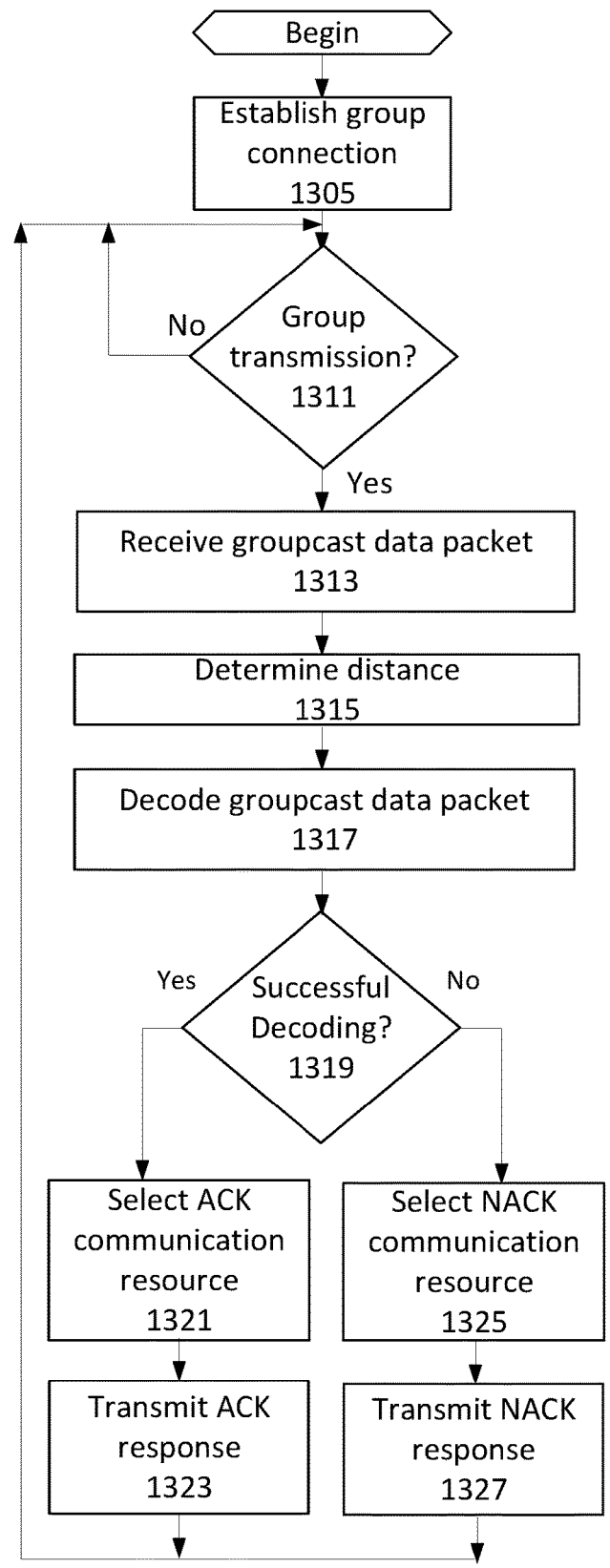
FIGS. 13-17 are flow charts illustrating operations of wireless devices (also referred to as wireless communication devices, UEs, etc.) according to some embodiments of inventive concepts.

FIG. 12 is a block diagram illustrating elements of a node 1200 (also referred to as a network node, base station, eNB, eNodeB, gNB, gNodeB, etc.) of a Radio Access Network (RAN) configured to provide cellular communication according to embodiments of inventive concepts. As shown, the network node 1200 may include a transceiver circuit 1201 (also referred to as a transceiver) including a transmitter and a receiver configured to provide uplink and downlink radio communications with wireless devices such as wireless device 1100. The network node may include a network interface circuit 1207 (also referred to as a network interface) configured to provide communications with other nodes (e.g., with other base stations and/or core network nodes) of the RAN and/or core network. The network node may also include a processor circuit 1203 (also referred to as a processor) coupled to the transceiver circuit, and a memory circuit 1205 (also referred to as memory) coupled to the processor circuit. The memory circuit 1205 may include computer readable program code that when executed by the processor circuit 1203 causes the processor circuit to perform operations according to embodiments disclosed herein. According to other embodiments, processor circuit 1203 may be defined to include memory so that a separate memory circuit is not required.

As discussed herein, operations of the network node may be performed by processor 1203, network interface 1207, and/or transceiver 1201. For example, processor 1203 may control transceiver 1201 to transmit communications through transceiver 1201 over a radio interface to one or more wireless devices and/or to receive communications through transceiver 1201 from one or more wireless devices over a radio interface. Similarly, processor 1203 may control network interface 1207 to transmit communications through network interface 1207 to one or more other network nodes and/or to receive communications through network interface from one or more other network nodes. Moreover, modules may be stored in memory 1205, and these modules may provide instructions so that when instructions of a module are executed by processor 1203, processor 1203 performs respective operations.

Link adaptation may be used to select proper modulation, coding and other signal and protocol parameters to adapt to the conditions on the radio link, e.g., pathloss, the interference due to signals coming from other transmitters, the sensitivity of the receiver, the available transmitter power margin, etc. In LTE/NR, based on some measurements indicating the quality of signal reception, the base station (BS) may select a proper modulation and coding scheme (MCS) to achieve a good tradeoff between spectrum efficiency and signal reception quality. The measurement indicators can include channel quality indicator (CQI) feedback and acknowledgement (ACK)/negative acknowledgement (NACK) feedbacks from the target receiver.

Similarly, in power control, based on some measurements indicating the radio-link condition, the transmitter may adjust its transmit power accordingly. By doing so, the interference to other transmissions can be minimized on condition of satisfying the reception quality requirement of the desired link.

In ACK/NACK based retransmission, the transmitter resends a packet if it receives a NACK from the target receiver. In this way, the reliability requirement may be satisfied without consuming unnecessary extra radio resources.

In LTE/NR, link adaptation, power control, and ACK/NACK based retransmission may be used to assist unicast transmission. Note that for all three of these mechanisms, the transmitter needs to be aware of who is the target receiver, i.e., the transmitter knows the address/identity of the target receiver.

LTE sidelink V2X targets only a broadcast scenario. In this case, since the transmitter is not aware of its target receivers, there are no feedback and link adaptation features.

In NR, since sidelink unicast and groupcast are expected to be supported, link adaptation, power control, and ACK/NACK-based retransmission may become promising mechanisms to enable more efficient sidelink design.

For sidelink unicast, since there is only one target receiver whose identity is known at the transmitter, the design of sidelink link adaptation, power and ACK/NACK based retransmission may follow the principle of LTE/NR Uu link design.

Two approaches to support sidelink groupcast are described below.

In one of the two approaches, sidelink groupcast may be treated in the same way as sidelink broadcast. This approach clearly does not leverage the potentials of groupcast, where the transmitter indeed has the knowledge of target receivers. In this way, there is no feedback from the receivers to the transmitter and no link adaptation, leading to low spectral efficiency. For example, even if channel conditions are good, the sidelink transmitter may keep using a low MCS value, i.e., an unnecessarily robust modulation and coding scheme, which may limit the achievable data rate. In fact, since the transmitter is aware of the identity(ies) of the target group members, there is potential to implement smarter transmission mechanisms by exploiting the feedback from the receivers.

In a second approach of the two approaches sidelink groupcast may be treated as multiple independent unicast connections, where each individual UE in the group is considered as one unicast receiver. In this approach, conventional feedback link adaptation, and power control mechanisms of the Uu interface (uplink and downlink in cellular networks) may be applied to each unicast connection respectively. Irrespective of applying Uu-type or sidelink-type unicast, this approach may be unappealing, since it does not leverage the fact that the message is common for the whole group. In the worst case—where every UE groupcasts a message—the number of unicast connections scales with the square of the number of UEs. For the same reason, it will also consume more radio resources, both for transmitting messages and for sending feedbacks.

Therefore, feedback, link adaptation, and power control mechanisms according to embodiments herein may be provided for sidelink V2X groupcast, which may take into account the V2X service requirements (payload, transmission rate, maximum end-to-end latency, reliability, data rate, minimum required communication range) as described above.

Embodiments described below provides methods to enable ACK- and/or NACK-feedback-based link adaptation, power control and retransmission for sidelink groupcast, potentially taking into account the communication range requirement of sidelink transmissions. More specifically, rules are defined regarding:

How sidelink groupcast receivers select resources to send ACK/NACK feedback based on their locations;
How a sidelink transmitter decides on an MCS or a transmit power or whether to perform a retransmission or not in response to the received ACK/NACK feedbacks Embodiments of inventive concepts may:
enable link adaptation and/or power control for sidelink V2X groupcast, which may increase spectrum efficiency and reduce interference to unwanted receivers;
balance between simplicity and cost in terms of resource use for sidelink V2X groupcast;
make use of the communication range, which is a requirement for V2X, for sidelink design.

The embodiments described below are described in the context of sidelink V2X communications. However, most of the embodiments are applicable to direct communications between UEs, in other scenarios involving device-to-device communications.

The embodiments describe methods to enable HARQ-feedback-based link adaptation, power control and retransmission for sidelink groupcast, potentially taking into account the communication range requirement of V2X applications.

According to some embodiments, feedback ACK and/or NACK may be provided on different resources depending on locations of receivers.

The receiver UEs of sidelink groupcast may use different resources to send ACK and/or NACK feedback, where the resource selection depends on the location of the receivers. The ACK and/or NACK feedback may include a groupcast identifier that identifies the groupcast session.

Two approaches of transmitting ACK/NACK feedbacks may be used. In a first approach of the two approaches, the ACK/NACK bit may be carried by a physical channel, in a similar way that data packets or control information is carried. This approach requires channel coding, cyclic redundancy check (CRC), reference signal, etc. and the receiver of the feedback needs to decode the physical channel to determine whether the bit is an ACK or a NACK or is for another indication.

In a second approach of the two approaches, referred to as sequence-based ACK/NACK feedback, the ACK/NACK bit may be mapped to a sequence and sent. The sequences being used may have some properties to facilitate the detection at the receiver of the feedback. In this approach, there is no channel coding or reference signal involved. The receiver of the feedback may detect the sequence (as opposed to decode the physical channel in the first approach), e.g., by correlating the received (noisy and interfered) sequence with the local copies if the clean sequences and declaring a clean sequence being the sent one if the correlation is above a certain threshold. Thereafter the receiver knows whether it has received an ACK or a NACK.

Figure 1:
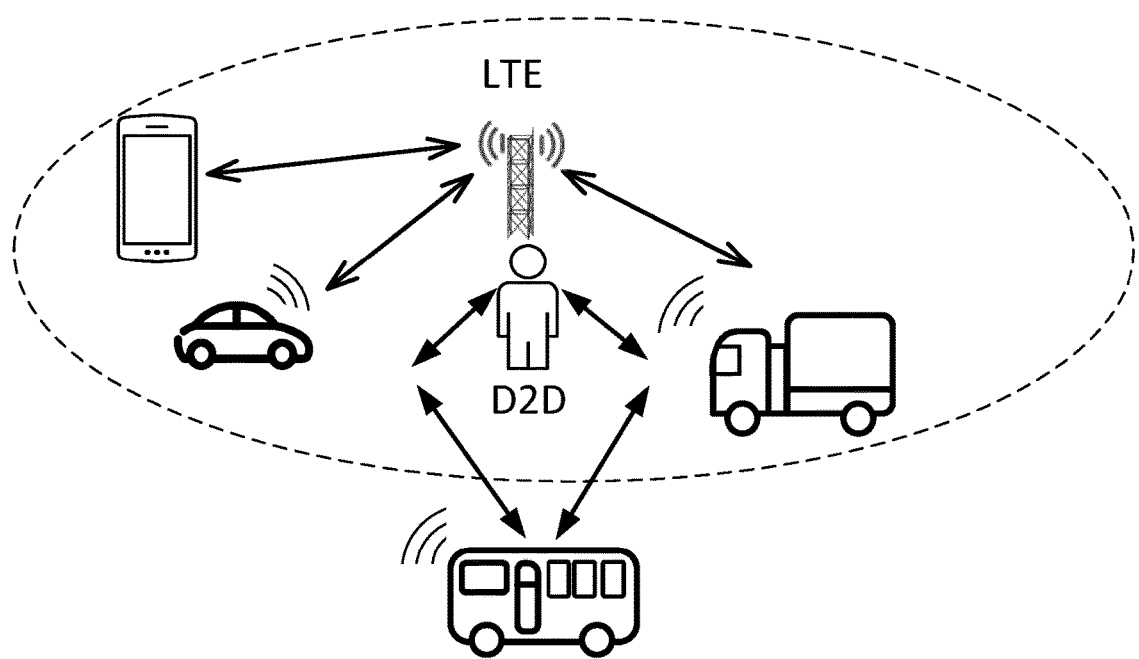
FIG. 1 is a schematic diagram illustrating V2X (Vehicle-to-Anything) communication scenarios in an LTE base network.
Figure 2:
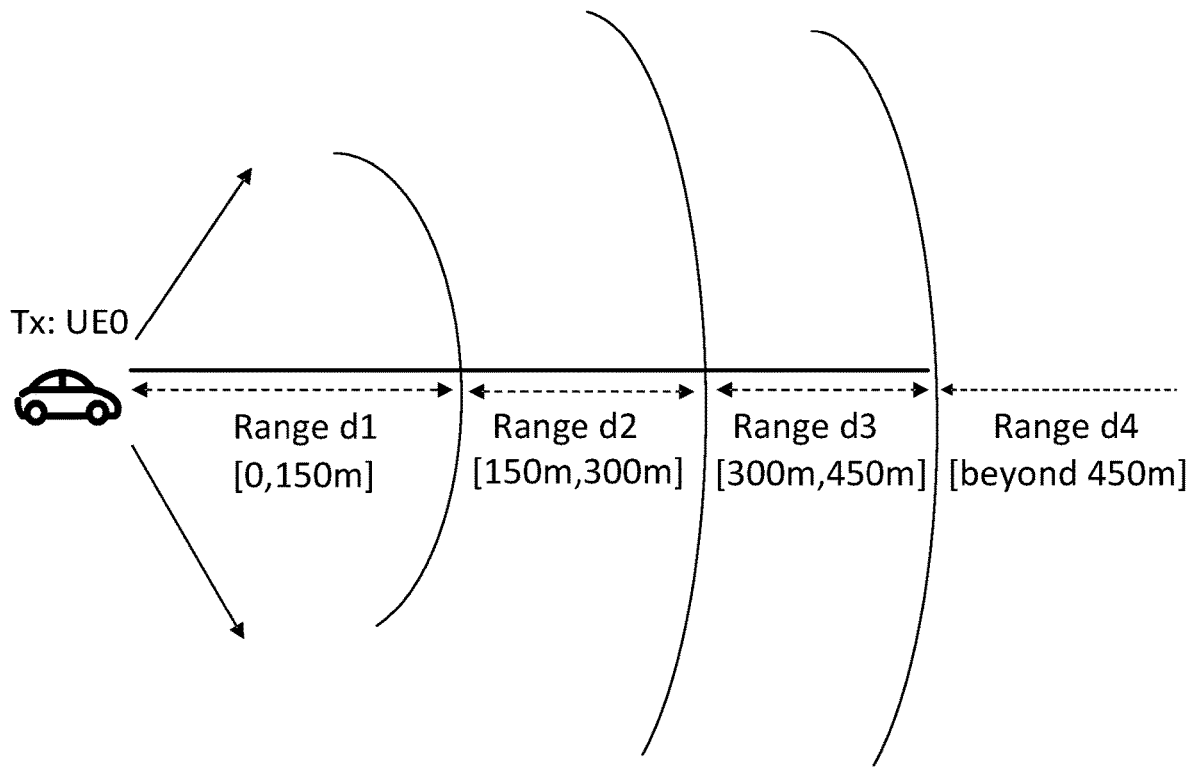
FIG. 2 illustrates a division of possible communication ranges according to some embodiments of inventive concepts.

In one embodiment, the possible communication range of the transmitter may be divided into disjoint range intervals. An example is illustrated in FIG. 2, which illustrates a division of possible communication ranges according to some embodiments. In FIG. 2, the possible communication range is divided into four intervals: [0,150 m], [150 m, 300 m], [300 m, 450 m], and [beyond 450 m].

In an alternative of the embodiment, there is no division of the communication range, i.e., there is only one range interval: [beyond 0m].

Figure 3:
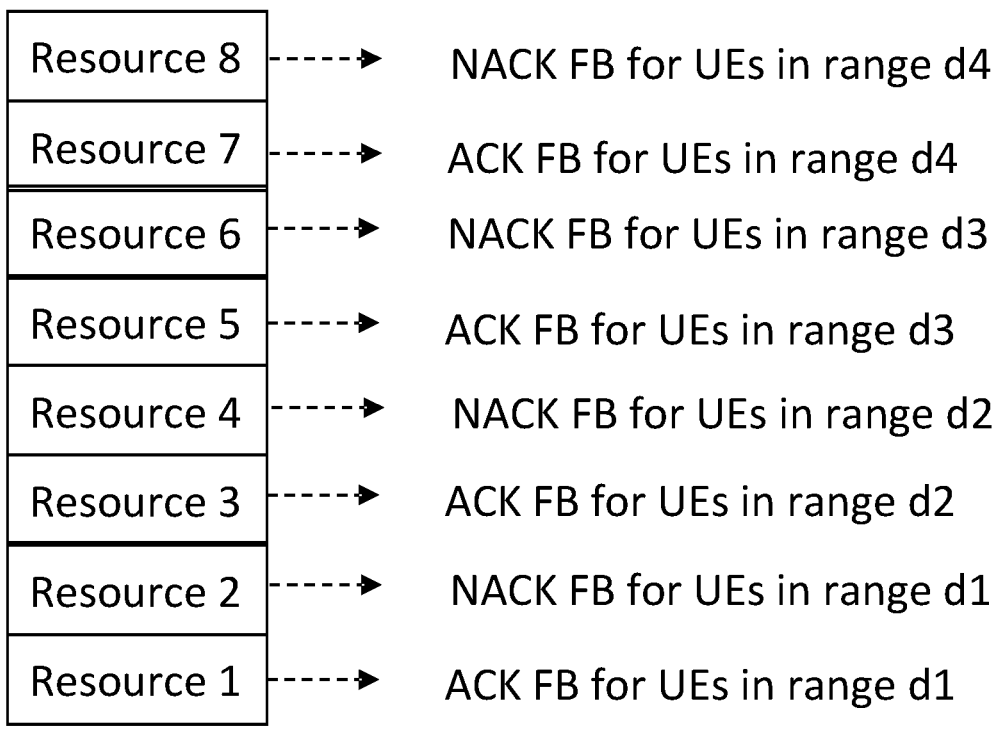
FIG. 3 illustrates different resources to transmit ACK and NACK feedbacks for UEs in different communication ranges according to some embodiments of inventive concepts.

In one embodiment, different resources for transmitting ACK and/or NACK feedbacks are allocated to the UEs belonging to different range intervals. In some examples, the different resources are orthogonal resources. An example of different range intervals is illustrated in FIG. 3, which illustrates different resources to transmit ACK and NACK feedbacks for UEs in different communication ranges according to some embodiments.

Figure 4:
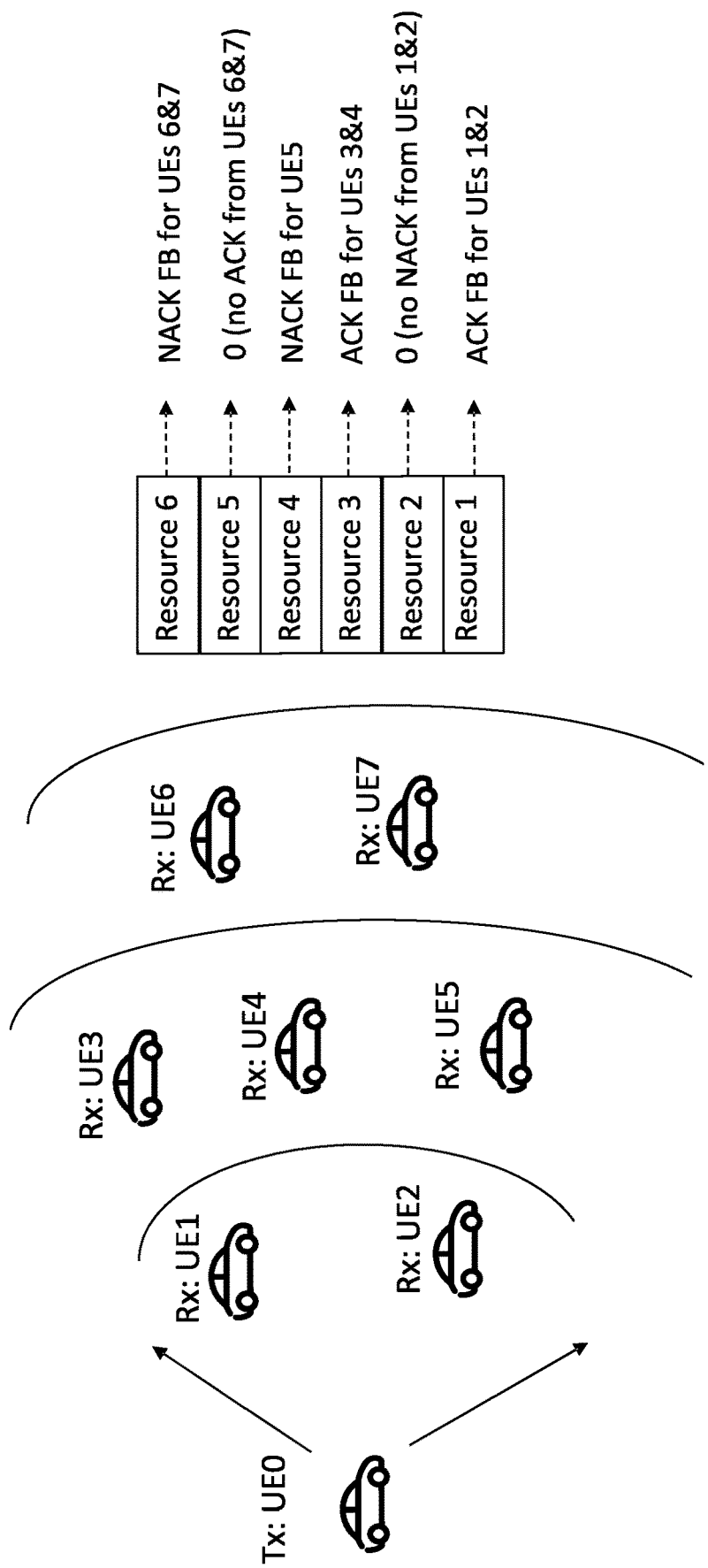
FIG. 4 illustrates HARQ feedback on different resources depending on receiver locations according to some embodiments of inventive concepts.

In one embodiment, the sidelink receivers may be classified into several sub-groups depending on their distance with respect to the sidelink transmitter. More specifically, the receivers falling into the same range interval may belong to the same sub-group. The receivers belonging to the same sub-group may send ACK and NACK feedbacks in the corresponding resources allocated for that range interval. An example of HARQ feedback on different resources depending on receiver locations is illustrated in FIG. 4. In FIG. 4, UEs 1 to 7 are the target receivers of the Tx UE0. Depending on their communication range with respect to UE0, UEs 1 to 7 are grouped into 3 sub-groups: UEs 1&2 located in Range d1, UEs 3&4&5 located in Range d2, and UEs 6&7 located in Range d3. In this way, as illustrated in FIG. 4, UE1 and UE2 will send ACK feedback on resource 1 and NACK feedback on resource 2, depending on their respective local decoding outcomes. Similarly, UE3, UE4 and UE5 will send ACK feedback on resource 3 and NACK feedback on resource 4; and UE6 and UE7 will send ACK feedback on resource 6 and NACK feedback on resource 7.

According to the embodiment illustrated in FIG. 4, the sidelink receivers falling into the same range interval can use the same signal for ACK feedback and another same signal for NACK feedback. This is sometimes referred to as a single-frequency network (SFN) or SFN'ed ACK/NACK from different UEs falling into the same range interval. Note that a single-frequency network or SFN is a term used for multicast/broadcast communication when transmissions of the same signal from different UEs may occur using the same time, frequency and spatial resource. With a SFN, the UE receiving the signal may see a combination of the transmitted signals.

In an alternative embodiment, there is only one range interval, i.e., [beyond 0m]. All the sidelink receivers in this alternative embodiment belong to one same sub-group.

The range intervals used to divide the communication range, e.g., [0,150 m], [150 m, 300 m], [300 m, 450 m], and [beyond 450 m] described above, may be configured within the link establishment or discovery phase. A receiving UE may determine the distance between the receiving UE and the transmitter UE and determine which range interval the receiving UE is within.

The association between resources for feedback and the corresponding range interval may be configured within the link establishment or discovery process. For example, in one embodiment, a receiver UE may receive a configuration from the transmitter or a network node. The receiver UE decodes information in the configuration on which resources to use for ACK and/or NACK for each range interval. In another embodiment, the transmitter UE and the receiver UE negotiate which resources to use for the range intervals.

The division of the possible communication range into range intervals and/or the association of resources for feedback with the corresponding range interval may be performed by the transmitter UE and indicated to the receiver UEs via SCI in PSCCH or any equivalent control channel (such as MAC CE, RRC).

In one embodiment, both ACK and NACK feedbacks are performed. The receivers belonging to the same sub-group, i.e., receivers falling into the same range interval, may send ACK and NACK feedbacks in the corresponding resources allocated for that range interval. An example is illustrated in FIG. 5, which illustrates ACK and NACK feedback on different resources depending on receiver locations. In FIG. 5, UEs 1 to 4 have successfully decoded the transmission while UEs 5 to 7 have failed. The receivers may be configured to perform both ACK and NACK by the transmitting UE or by the network node. The receivers may be configured to have a default configuration to perform both ACK and NACK.

In another embodiment, only NACK feedback is performed, i.e., only sidelink receivers that have failed to decode will send (NACK) feedback in the resource allocated for that range interval. An example is illustrated in FIG. 6, which illustrates pure NACK feedback on different resources depending on receiver locations. In FIG. 6, UEs 1 to 4 have successfully decoded the transmission while UEs 5 to 7 have failed. The receivers may be configured to perform only NACK by the transmitting UE or by the network node. The receivers may be configured to have a default configuration to perform only NACK.

Figure 7:
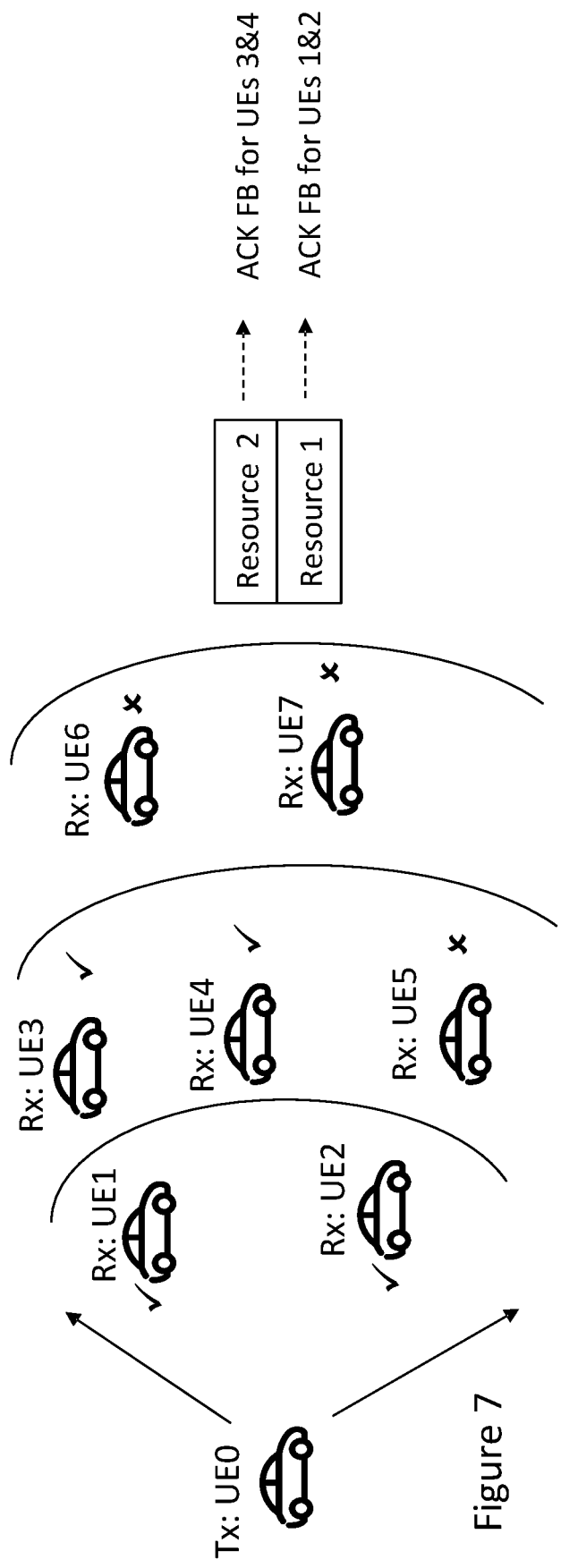
FIG. 7 illustrates pure ACK feedback on different resources depending on receiver locations according to some embodiments of inventive concepts.

In another embodiment, only ACK feedback is performed, i.e., only sidelink receivers that have successfully decoded the sidelink transmission will send (ACK) feedback in the resource allocated for that range interval. An example is illustrated in FIG. 7, which illustrates pure ACK feedback on different resources depending on receiver locations. In FIG. 7, UEs 1 to 4 have successfully decoded the transmission while UEs 5 to 7 have failed. The receivers may be configured to perform only ACK by the transmitting UE or by the network node. The receivers may be configured to have a default configuration to perform only ACK.

In another embodiment, ACK feedback is only performed for a first range of distances, i.e., only sidelink receivers that have successfully decoded the sidelink transmission will send (ACK) feedback in the resource allocated for a first range of distances while NACK feedback is only performed for a second range of distances i.e., only sidelink receivers that have failed to decode the sidelink transmission will send (NACK) feedback in the resource allocated for a second range of distances. An example is illustrated in FIG. 10 where the first range of distances is ranges d1 and d2 and the second range of distances is range d3. In FIG. 10, UEs 1-4 in the first range of distances have successfully decoded the transmission while UE 5 in the first range of distances has failed to decode the transmission. UEs 1-4 will transmit ACK while UE5 will refrain from transmitting a NACK. Similarly, UE7 has successfully decoded the transmission in the second range of distances while UE6 has failed to decode the transmission in the second range of distances. UE6 will transmit NACK while UE7 will refrain from transmitting ACK. The first range of distances and the second range of distances may include multiple ranges of distances, including non-overlapping ranges of distances. The first range of distances and the second range of distances may be configured by the transmitting UE or by the network node. The configuration may comprise a parameter for each range of distance configuring if only ACK (and no NACK) or only NACK (and no ACK) shall be transmitted. The receivers may be configured to have a default first range of distances and/or a default second range of distances and/or a default ACK and/or NACK reporting per range of distances.

In another embodiment, the UEs belonging to a sub-group closer to the transmitter may perform only NACK and the UEs belonging to a sub-group further from the transmitter UE may perform ACK and NACK depending on packet reception. For instance, UE1 and UE2 in FIG. 4 perform only NACK operation and remaining UEs perform both ACK and NACK depending on packet reception. Similarly, the UEs belonging to a sub-group closer to the transmitter may perform only ACK and the UEs belonging to a sub-group further from the transmitter UE may perform both ACK and NACK depending on packet reception.

The different resources described in the embodiments above may be interpreted from time domain, frequency domain, spatial domain, code domain, or a combination thereof.

According to some embodiments, transmission adjustment may be provided depending on HARQ feedback The sidelink transmitter may adjust its own transmission, including MCS, transmit power, and/or retransmission or not, based on the energy or power measured on the resources allocated for sending ACK and/or NACK feedbacks. The measured energy or power can be indicated by a Received Signal Strength Indicator (RSSI) or Received Signal Receive Power (RSPR).

MCS adjustment for the case of only one range interval is discussed below.

Figure 8:
FIG. 8 illustrates HARQ feedback when all the receivers belong to the same sub-group according to some embodiments of inventive concepts.

In one embodiment, when there is only one range interval and all the receivers use one same resource for sending ACK and another one same resource for sending NACK (as illustrated in FIG. 8), the receiver of the feedback can use the measured power or energy at the feedback resources to determine how many UEs have sent a certain type of feedback. Independently, the receiver of the feedback can use the measured power or energy for both purposes: to determine whether it is an ACK or a NACK (e.g., if the received energy is larger than a threshold in the ACK resource then the receiver declares that an ACK was received) and to determine how many UEs have sent a certain type of feedback. For example, the sidelink transmitter may compare the energy measured on the two resources, for example EA for ACK resource and EN for NACK resource. The transmitter determines the MCS adjustment based on the comparison.

In one example, responsive to the ratio or difference between EA and EN being smaller than a threshold TH1 i.e., EA/EN<TH1 or EA−EN<TH1, the transmitter may decrease the MCS, i.e., use a more robust modulation and coding scheme, for the following groupcast transmissions; otherwise the transmitter may keep the same MCS.

In another example, responsive to the ratio or difference between EA and EN being larger than a threshold TH2 i.e., EA/EN>TH2 or EA−EN>TH2, the transmitter may increase the MCS, i.e., use a modulation and coding scheme that gives higher data rate, for the following groupcast transmissions; otherwise the transmitter may keep the same MCS.

FIG. 8 illustrates HARQ feedback when all the receivers belong to the same sub-group.

In an alternative of the embodiment, only NACK feedback is performed, i.e., only sidelink receivers that have failed decoding will send (NACK) feedback. The transmitter determines the MCS adjustment based on the energy measured on the NACK resource.

In one example, responsive to the measured NACK energy being larger than a threshold, the transmitter may decrease MCS; otherwise the transmitter may keep the same MCS.

In another example, responsive to the measured NACK energy being smaller than a threshold, the transmitter may increase MCS; otherwise the transmitter may keep the same MCS.

In another alternative of the embodiment, only ACK feedback is performed, i.e., only sidelink receivers that have successfully decoded the sidelink transmission may send (ACK) feedback. Then, the transmitter determines the MCS adjustment based on the energy measured on the ACK resource.

In one example, responsive to the measured ACK energy being larger than a threshold, the transmitter may increase MCS; otherwise the transmitter may keep the same MCS.

In another example, responsive to the measured ACK energy being smaller than a threshold, the transmitter may decrease MCS; otherwise the transmitter may keep the same MCS.

MCS adjustment for the case of more than one range intervals is discussed below.

In another embodiment, where different resources are allocated to different range intervals for sending ACK and/or NACK feedbacks (as illustrated in FIG. 6), the sidelink transmitter may compare the energy measured on the multiple different resources. The transmitter determines the MCS adjustment based on the energy comparison and the transmitter's required/target communication range, potentially together with other factors/parameters such as, but not limited to, channel busy ratio (CBR), transmission requirements in terms of reliability, latency, and data rate.

In one example, responsive to the ratio or the difference between EA and EN being smaller than a threshold for all the communication ranges, the transmitter may decrease the MCS for the following groupcast transmissions; otherwise the transmitter may keep the same MCS.

In another example, responsive to the ratio or the difference between EA and EN being larger than a threshold for all the communication ranges, the transmitter may increase the MCS for the following groupcast transmissions; otherwise the transmitter may keep the same MCS.

An example is illustrated in FIG. 9, which illustrates an example of ACK and NACK feedback on different resources depending on different communication ranges with respect to the transmitter. In FIG. 9, UEs 1 to 5 have successfully decoded the transmission while UEs 6 to 8 have failed to decode the transmission. By comparing the ACK and NACK energy measured on, for example, the 6 different resources, Tx UE0 is aware that all, or most of, the receivers belonging to range d1 and range d2 have successfully decoded the transmission, while all of, or most of, the receivers belonging to range d3 have failed.

In some cases relating to FIG. 9, e.g., when the CBR is smaller than a threshold and/or the transmitter's target communication range is larger than what d1, d2 and d3 have covered, the transmitter may decrease MCS. For example, when UE0's target communication range includes UE 8 as well, it is larger than what d1, d2, and d3 have covered.

In some other cases relating to FIG. 9, e.g., when CBR is larger than a threshold and/or the transmitter's target communication range is similar to what d1, d2 and d3 have covered, the transmitter may keep the same MCS or even increase MCS. For instance, when UE0's target communication range only includes UEs 1 to 7 but not UE 8, the target communication range is similar to what d1, d2 and d3 have covered. In this case, to not further congest the channel by using more resources, the transmitter may not lower the MCS to improve reliability.

In an alternative of the embodiment, only NACK feedback is performed, i.e., only sidelink receivers that have failed decoding may send (NACK) feedback. The transmitter determines the MCS adjustment based on the energy measured on the NACK resource and the transmitter's required/target communication range, potentially together with other factors/parameters such as, but not limited to, channel busy ratio (CBR), transmission requirements in terms of reliability, latency, and data rate.

In another alternative of the embodiment, only ACK feedback is performed, i.e., only sidelink receivers that have successfully decoded the sidelink transmission will send (ACK) feedback. In this alternative embodiment, the transmitter determines the MCS adjustment based on the energy measured on the ACK resource and the transmitter's required/target communication range, potentially together with other factors/parameters such as, but not limited to, channel busy ratio (CBR), transmission requirements in terms of reliability, latency, and data rate.

Transmit power adjustment for the case of only one range interval is discussed below.

In one embodiment, when there is only one range interval and all the receivers use one same resource for sending ACK as well as another one same resource for sending NACK, the sidelink transmitter may compare the energy measured on the two resources, for example, EA for ACK resource and EN for NACK resource. The sidelink transmitter determines the transmit power based on the energy comparison. In one example, responsive to the ratio or difference between EA and EN being smaller than a threshold, the transmitter may increase the transmit power. In another example, responsive to the ratio or difference between EA and EN being larger than a threshold, the transmitter may decrease the transmit power.

In an alternative of the embodiment, only NACK feedback is performed. In this embodiment, the transmitter determines the transmit power based on the energy measured on the NACK resource. In one example, responsive to the measured NACK energy being larger than a threshold, the transmitter may increase the transmit power. In another example, responsive to the measured NACK energy being smaller than a threshold, the transmitter may decrease the transmit power.

In another alternative of the embodiment, only ACK feedback is performed. In this embodiment, the transmitter may determine the transmit power based on the energy measured on the ACK resource. In one example, responsive to the measured ACK energy being larger than a threshold, the transmitter may decrease the transmit power. In another example, responsive to the measured ACK energy being smaller than a threshold, the transmitter may increase the transmit power.

Transmit power adjustment for the case of more than one range interval is discussed below.

In another embodiment, where different resources are allocated to different range intervals for sending ACK and/or NACK feedbacks (as illustrated in FIG. 4), the sidelink transmitter may compare the energy measured on the multiple different resources. In this embodiment, the transmitter adjusts the Tx power based on the energy comparison and the transmitter's required/target communication range, potentially together with other factors/parameters such as, but not limited to, channel busy ratio (CBR), transmission requirements in terms of reliability, latency, and data rate. For example, the transmitter increases transmit power when it receives NACK(s) from closer sub-group UE(s), while the transmitter decreases transmit power when it receives ACKs from all the UEs within its target communication range.

Retransmission adjustment for the case of more than one range interval is discussed below.

In one embodiment, where different resources are allocated to different range intervals for sending ACK and/or NACK feedbacks (as illustrated in FIG. 4), the sidelink transmitter may compare the energy measured on the multiple different resources. The transmitter determines whether or not to perform a retransmission based on the energy comparison and the transmitter's required/target communication range, potentially together with other factors/parameters such as, but not limited to, channel busy ratio (CBR), transmission requirements in terms of reliability, latency, and data rate. For example, the transmitter performs a retransmission when it receives NACK(s) from closer sub-group UE(s). On the other hand, under certain situations, e.g., when CBR is high, the transmitter doesn't retransmit if it receives ACK(s) from closer sub-group UE(s) but NACK (s) from further sub-group UE(s).

The above embodiments relating to transmission adjustment are presented using energy measured on different resources. The same idea may be applied to the measured power, i.e., comparing the power measured on different resources.

One or more of the thresholds described relating to transmission adjustment may be configured within the link establishment or discovery process.

According to another embodiment, maximum and minimum values of MCS and/or power may be either pre-configured or configured by the network.

Some embodiments of inventive concepts may thus enable ACK and/or NACK feedback based link adaptation, power control and/or retransmission for sidelink groupcast, potentially taking into account the communication range requirement of sidelink transmissions.

Operations of a receiving wireless device 1100 will now be discussed with reference to the flow charts of FIGS. 13-16 according to some embodiments of inventive concepts. For example, modules may be stored in memory 1105 of FIG. 11, and these modules may provide instructions so that when the instructions of a module are executed by wireless device processor 1103, processor 1103 performs respective operations of the flow charts of FIGS. 13-16.

At block 1305, processor 1103 may perform a groupcast session establishment for a group of wireless devices including the wireless device 1100 and a number of other wireless devices. The groupcast session establishment may be based on a configuration received (through transceiver 1101) from a wireless communication network node such as network node 1200, or the groupcast session may be established based on communications (through transceiver 1101) between the wireless devices of the group. The groupcast session establishment, for example, may provide information to define which communication resources to use for ACK and/or NACK transmissions for different ranges of distances, a destination group identification (ID) used for identifying groupcast data packets of the group and/or respective device identifications for each of the wireless devices of the group, and whether both ACKs and NACKS should be transmitted or whether only ACKs or NACKS are to be transmitted for the different ranges of distances. There may be multiple communication resources associated with each range of distances. For example, there may be multiple ACK communication resources and/or multiple NACK communication resources. The distances and the communication resources may be non-overlapping distances and resources. The communication resource may be defined by at least one of a time resource, a frequency resource, and/or a code resource. The ranges of distances and identification of the resources to use for the ranges of distances when received from the transmitting wireless device may be defined based on control information received from the transmitting wireless device. The control information used may be sidelink control information (SCI), a medium access control element (MAC CE), and/or radio resource control (RRC) information.

At operation 1311, the processor 1103 may receive (through transceiver 1101) a transmission and determines whether the transmission is a group transmission. Responsive to the transmission not being a group transmission, the wireless device 1100 may determine if a next received transmission is a group transmission.

Responsive to the transmission being a group transmission, at operation 1313, the processor 1103 may receive (through transceiver 1101) a groupcast data packet from a transmitting wireless device of the group. The groupcast data packet may include the destination group ID. The transmitting wireless device may be one of the other wireless devices of the group (i.e., one of the plurality of other wireless devices of the group).

At operation 1315, the processor 1103 determines a distance of the receiving wireless device 1100 from the transmitting wireless device. The distance of the receiving wireless device from the transmitting wireless device may be determined based on location information received from the transmitting wireless device. The location information may also be determined based on location information of the transmitting wireless device received from a network node.

At operation 1317, the processor 1103 may decode the groupcast data packet. The decoding may be successful or may fail. At operation 1319, the receiving wireless device 1100 determines whether the decoding was successful or failed.

At operation 1321, when the decoding was successful, the processor 1103 may select a communication resource for an Acknowledgement (ACK) message for the groupcast data packet, wherein the communication resource is selected based on the distance from the transmitting wireless device 1100. For example, a first range of distances may be associated with a first set of at least one communication resource and a second range of distances may be associated with a second set of at least one communication resource. The first set may have a first ACK communication resource. Similarly, the second set may have a second ACK communication resource. The selection of the ACK communication resource may include selecting the first set of at least one communication resource (e.g., the first ACK resource) based on the distance from the transmitting wireless device being within the first range of distances responsive to successfully decoding the groupcast data packet or selecting the second set of at least one communication resource (e.g., the second ACK resource) based on the distance from the transmitting wireless device being within the second range of distances responsive to successfully decoding the groupcast data packet.

When a second groupcast data packet is received and successfully decoded, operations 1313-1319 may be performed as described above for the second groupcast data packet. The second groupcast data packet may be from the same transmitting wireless device or from a different transmitting wireless device. The selection of the ACK communication resource for the second groupcast data packet may be selected based on the distance from the transmitting wireless device when the same transmitting wireless device transmitted the second groupcast data packet or the distance from the different transmitting wireless device when the different transmitting device transmitted the second groupcast data packet.

At operation 1323, an ACK response message may be transmitted (through transceiver 1101) to the transmitting wireless device using the communication resource selected based on the distance from the transmitting wireless device.

Returning to operation 1319, when the decoding of the groupcast data packet has failed, at operation 1325 the processor 1103 may select a communication resource for a Negative Acknowledgement (NACK) message for the groupcast data packet, wherein the communication resource is selected based on the distance the receiving wireless device 1100 is from the transmitting wireless device 1100. For example, a first range of distances may be associated with a first set of at least one communication resource and a second range of distances may be associated with a second set of at least one communication resource. The first set may have a first NACK communication resource. Similarly, the second set may have a second NACK communication resource. The selection of the NACK communication resource may include selecting the first set of at least one communication resource (e.g., the first NACK resource) based on the distance the receiving wireless device 1100 is from the transmitting wireless device being within the first range of distances responsive to successfully decoding the groupcast data packet or selecting the second set of at least one communication resource (e.g., the second NACK resource) based on the distance the receiving wireless device 1100 is from the transmitting wireless device being within the second range of distances responsive to successfully decoding the groupcast data packet.

When a second groupcast data packet is received and has also failed decoding, operations 1313-1319 may be performed as described above for the second groupcast data packet. The second groupcast data packet may be from the same transmitting wireless device or from a different transmitting wireless device. The selection of the NACK communication resource for the second groupcast data packet may be selected based on the distance from the transmitting wireless device when the same transmitting wireless device transmitted the second groupcast data packet or the distance from the different transmitting wireless device when the different transmitting device transmitted the second groupcast data packet. For example, if the distance is within the first range, the first NACK communication resource is selected. If the distance is not within the first range of distances but is within the second range of distances, the second NACK communication resource is selected.

At operation 1327, a NACK response message may be transmitted (through transceiver 1101) to the transmitting wireless device using the communication resource selected based on the distance from the transmitting wireless device.

Operations 1311-1327 are repeated for each group transmission received by the receiving wireless device 1100.

Figure 14:
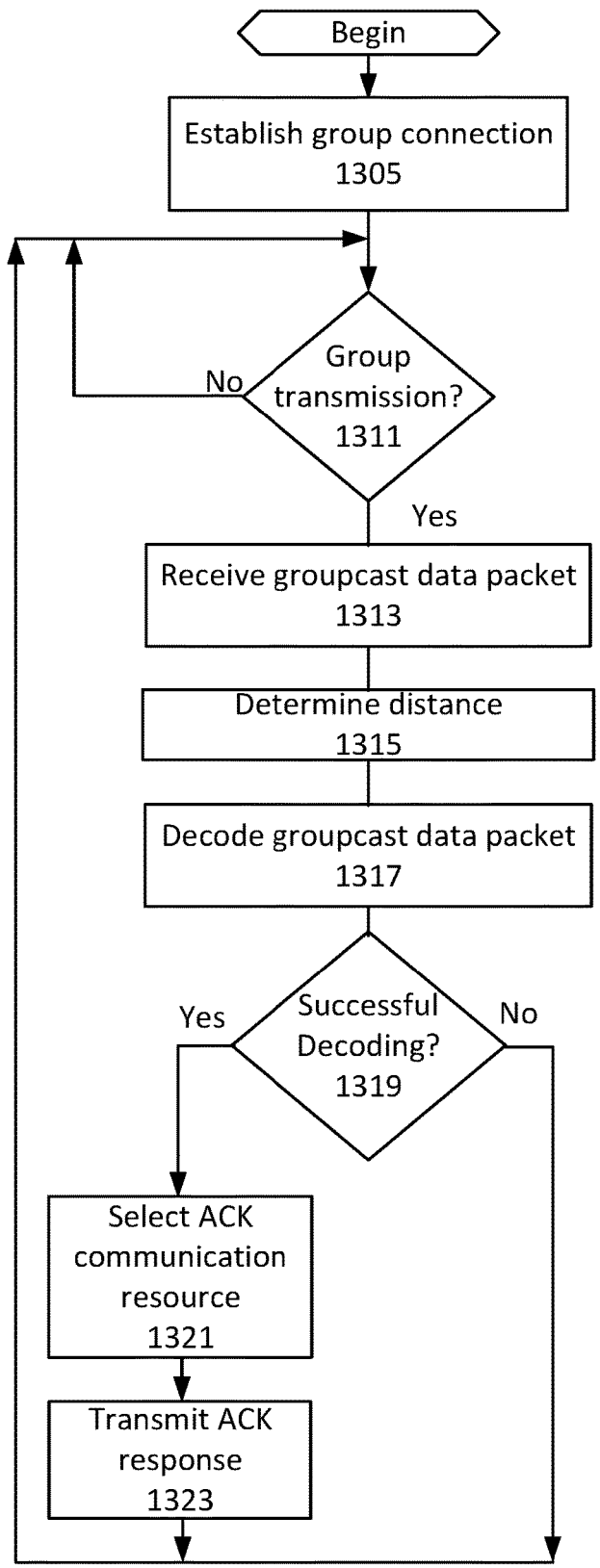

Turning to FIG. 14, in another embodiment, operations 1305 to 1319 may be performed as described above. Thus, a group connection may be established, a groupcast data packet may be received, the distance to the transmitting wireless device may be determined, and the groupcast data packet may be decoded successfully or has failed. In this embodiment, operations 1321 and 1323 may be performed as described above. However, the receiving wireless device may refrain from performing operations 1325 and 1327 (i.e., refrain from selecting a NACK communication resource and refrain from transmitting a NACK response) for a groupcast data packet responsive to failure decoding the groupcast data packet.

Figure 15:
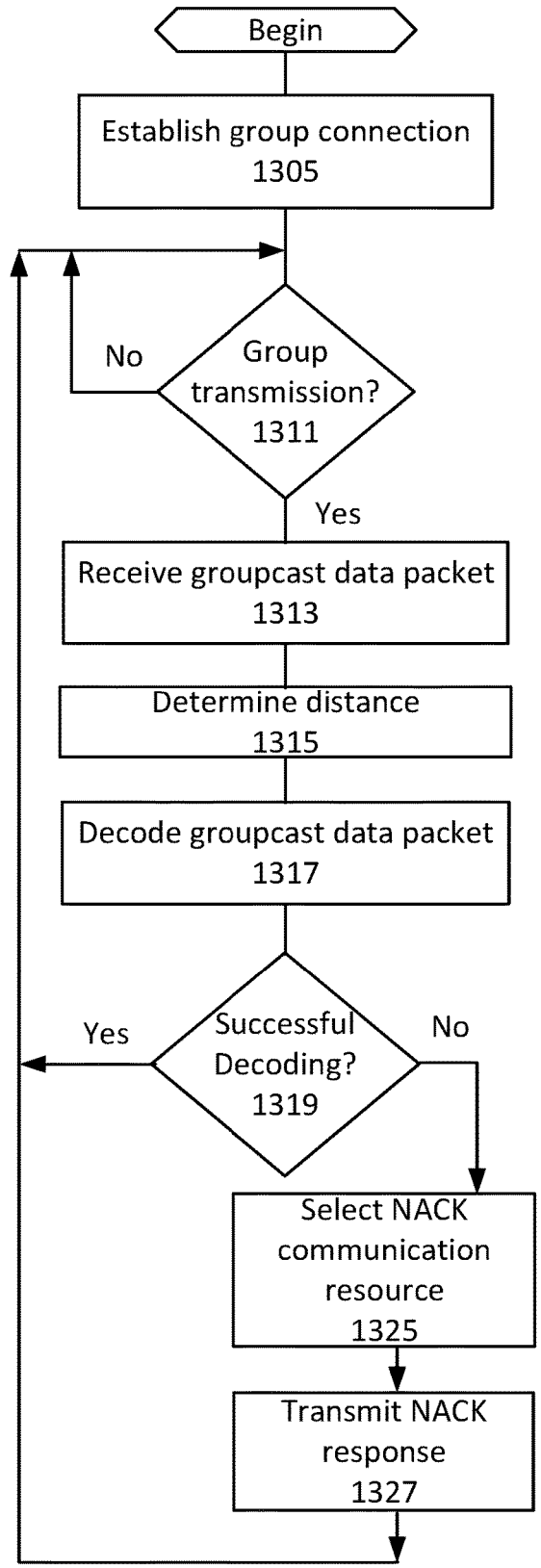

Turning to FIG. 15, in a further embodiment, operations 1305 to 1319 may be performed as described above for groupcast data packets. Thus, a group connection may be established, a groupcast data packet may be received, the distance to the transmitting wireless device may be determined, and the groupcast data packet may be decoded successfully or has failed. In this embodiment, operations 1325 and 1327 may be performed as described above responsive to failure decoding the groupcast data packet. However, the receiving wireless device may refrain from performing operations 1321 and 1323 (i.e., refrain from selecting an ACK communication resource and refrain from transmitting an ACK response for a groupcast data packet) responsive to successfully decoding the groupcast data packet.

Figure 16:
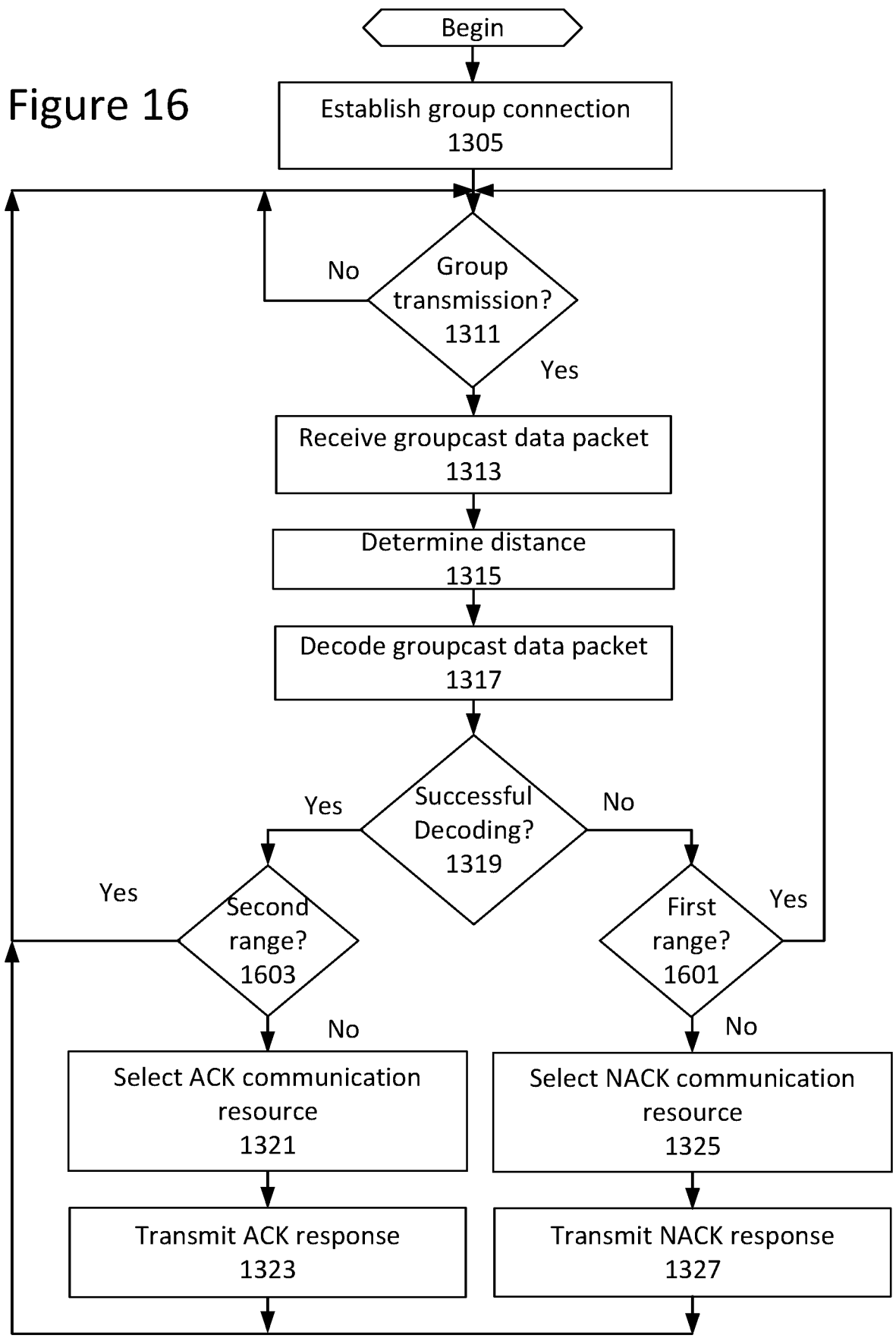

Turning to FIG. 16, in another embodiment, operations 1305 to 1319 may be performed as described above for groupcast data packets. Thus, a group connection may be established, a groupcast data packet may be received, the distance to the transmitting wireless device may be determined, and the groupcast data packet may be decoded successfully or has failed. In this embodiment, operations 1321 and 1323 may be performed as described above responsive to the distance being within a first range of distances responsive to successfully decoding the groupcast data packet. However, in operation 1601, the receiving wireless device may refrain from performing operations 1325 and 1327 (i.e., refrain from selecting a NACK communication resource and refrain from transmitting a NACK response) for a groupcast data packet responsive to failure decoding the groupcast data packet responsive to the distance being within the first range. In this embodiment, operations 1325 and 1327 may be performed as described above responsive to the distance being within a second range of distances. However, in operation 1603 the receiving wireless device may refrain from performing operations 1321 and 1323 (i.e., refrain from selecting an ACK communication resource and refrain from transmitting an ACK response) for a groupcast data packet responsive to successfully decoding the groupcast data packet responsive to the distance being within the second range. The first range and/or the second range may consist of multiple ranges of distances.

Figure 17:
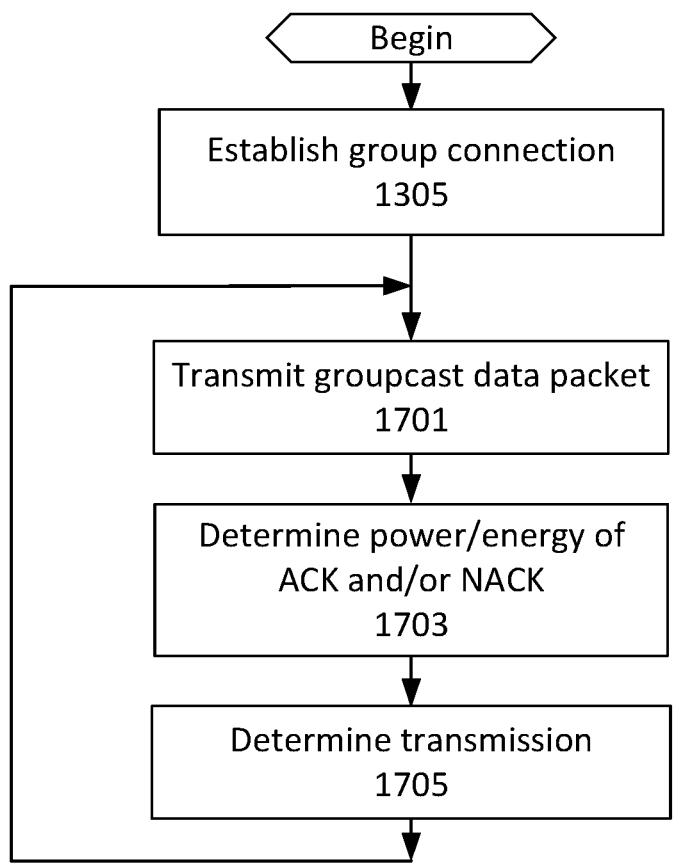

Operations of a transmitting wireless device 1100 will now be discussed with reference to the flow chart of FIG. 17 according to some embodiments of inventive concepts. For example, modules may be stored in memory 1105 of FIG. 11, and these modules may provide instructions so that when the instructions of a module are executed by wireless device processor 1103, processor 1103 performs respective operations of the flow chart of FIG. 17.

At operation 1305, a group connection is established. Details of establishing the group connection are described above with respect to FIG. 13.

At operation 1701, the processor 1103 transmits (through transceiver 1101) a groupcast data packet to a plurality of other wireless devices 1100 of the group. The groupcast data packet may include the destination group ID. The transmission may be a retransmission of a first groupcast data packet or a transmission of a second groupcast data packet.

At operation 1703, the receiving wireless device 1100 may determine a power/energy of at least one acknowledgment, ACK, message and/or negative acknowledgement, NACK, message received in response to the groupcast data packet. Respective ACK and NACK communication resources may be provided for the groupcast data packet, wherein determining the power/energy may include determining a combined power/energy received over the ACK communication resource for the groupcast data packet and determining a combined power/energy received over the NACK communication resource for the groupcast data packet.

The ACK and NACK communication resources may be a plurality of ACK communication resources and/or a plurality of NACK communication resources. Determining the combined power/energy received over the ACK communication resource may comprise determining a combined power/energy received over the plurality of ACK communication resources for the groupcast data packet, and wherein determining the combined power/energy received over the NACK communication resource may include determining a combined power/energy received over the plurality of ACK communication resources for the groupcast data packet.

A plurality of ranges of distances may be associated with respective pluralities of ACK and NACK communication resources for the groupcast data packet. Determining the combined power/energy received over the ACK communication resource and over the NACK communication resource may include determining combined powers/energies received over the plurality of ACK communication resources for the groupcast data packet and over the plurality of NACK communication resources for the groupcasts data packet. Determining the combined powers/energies received over the plurality of ACK communication resources may include applying different weightings to powers/energies received over at least two of the plurality of ACK communication resources, and/or wherein determining combined powers/energies received over the plurality of NACK communication resources comprises applying different weightings to powers/energies received over at least two of the plurality of NACK communication resources.

At operation 1705, processor 1103 may determine a transmission based on the power/energy of the at least one ACK message and/or NACK message. Determining the transmission may include performing the transmission using a modulation and coding scheme (MCS) determined based on the power/energy of the at least one ACK message and/or NACK message, and/or using a transmission power determined based on the power/energy of the at least one ACK message and/or NACK message. The at least one ACK message and/or NACK message may be a plurality of ACK messages received using a plurality of ACK communication resources and/or NACK messages using a plurality of NACK communication resources, wherein determining the power/energy comprises determining a combined power/energy of the plurality of ACK messages received using the plurality of ACK communication resources and/or determining a combined power/energy of the plurality of NACK messages received using the plurality of NACK communication resources, and wherein determining the transmission comprises determining the transmission based on the combined power/energy received over the plurality of ACK communication resources and/or the plurality of NACK communication resources.

Determining the combined power/energy received over the plurality of NACK communication resources comprises applying different weightings to powers/energies received over at least two of the plurality of NACK communication resources. Determining the combined power/energy received over the plurality of ACK communication resources comprises applying different weightings to powers/energies received over at least two of the plurality of ACK communication resources.

Determining the transmission may include performing the transmission using a MCS determined based on the power/energy of the at least one ACK message and/or NACK message and on a channel busy ratio (CBR) and/or transmission requirements, and/or using a transmission power determined based on the power/energy of the at least one ACK message and/or NACK message and on the CBR and/or transmission requirements. The transmission may be retransmitting of the first groupcast data packet. The retransmitting of the first groupcast data packet may be based on the combined powers/energies received over the pluralities of ACK and NACK communication resources for the groupcast data packet.

Determining the transmission may include determining a reduced MCS and/or increased power responsive to a ratio or difference between the combined power/energy received over the ACK communication resource and the combined power/energy received over the NACK communication resource being less than a threshold. A second groupcast data packet may be transmitted to the plurality of other wireless devices of the group using the reduced MCS and/or increased power responsive to the ratio or difference being less than the threshold. The threshold may be one of a plurality of thresholds used for comparison with the ratio or difference, wherein each threshold corresponds to a different MCS adaptation. The plurality of thresholds may be preconfigured or configured by a network node 1200. Transmitting the second groupcast data packet may comprise retransmitting the first groupcast data packet. The retransmitting of the groupcast data packet may be based on the combined powers/energies received over the pluralities of ACK and NACK communication resources for the groupcast data packet.

Determining a transmission may include determining an increased MCS and/or reduced power responsive to a ratio or difference between the combined power/energy received over the ACK communication resource and the combined power/energy received over the NACK communication resource being greater than a threshold. A second groupcast data packet may be transmitted to the plurality of other wireless devices of the group using the increased MCS and/or decreased power responsive to the ratio or difference being greater than the threshold. The threshold may be one of a plurality of thresholds used for comparison with the ratio or difference, wherein each threshold corresponds to a different MCS adaptation. The plurality of thresholds may be pre-configured or configured by a network node 1200. Transmitting the second groupcast data packet may comprise retransmitting the first groupcast data packet. The retransmitting of the groupcast data packet may be based on the combined powers/energies received over the pluralities of ACK and NACK communication resources for the groupcast data packet.

Determining a transmission may include maintaining a previous MCS and/or a previous power responsive to a ratio or difference between the combined power/energy received over the ACK communication resource and the combined power/energy received over the NACK communication resource being greater than a threshold. A second groupcast data packet may be transmitted to the plurality of other wireless devices of the group using the previous MCS and/or previous power responsive to the ratio or difference being greater than the threshold. The threshold may be one of a plurality of thresholds used for comparison with the ratio or difference, wherein each threshold corresponds to a different MCS adaptation. The plurality of thresholds may be pre-configured or configured by a network node 1200. Transmitting the second groupcast data packet may comprise retransmitting the first groupcast data packet. The retransmitting of the groupcast data packet may be based on the combined powers/energies received over the pluralities of ACK and NACK communication resources for the groupcast data packet.

Example embodiments of inventive concepts are set forth below.

1. A method of operating a receiving wireless device (1100) associated with a group, wherein the group includes the receiving wireless device and a transmitting wireless device, the method comprising:
  receiving (1313) a groupcast data packet from the transmitting wireless device of the group;
  determining (1315) a distance of the receiving wireless device from the transmitting wireless device;
  selecting (1321, 1325) a communication resource for one of an Acknowledgement, ACK, message or Negative Acknowledgement, NACK, message for the groupcast data packet, wherein the communication resource is selected based on the distance from the transmitting wireless device; and
  transmitting (1323, 1327) the one of the ACK message or NACK message for the groupcast data packet using the communication resource selected based on the distance from the transmitting wireless device.

2. The method of Embodiment 1, wherein a first range of distances is associated with a first set of at least one communication resource and a second range of distances is associated with a second set of at least one communication resource:
  wherein selecting the communication resource for the one of an ACK message or NACK message comprises selecting the first set of at least one communication resource based on the distance from the transmitting wireless device being within the first range; and
  wherein transmitting comprises transmitting the one of the ACK message or NACK message using a communication resource selected from the first set of at least one communication resource.

3. The method of Embodiment 2, wherein the first set comprises a first ACK communication resource and a first NACK communication resource, and wherein the second set comprises a second ACK communication resource and a second NACK communication resource, wherein selecting comprises selecting (1321) the first ACK communication resource responsive to successfully decoding the groupcast data packet based on the distance from the transmitting wireless device being within the first range, and wherein transmitting comprises transmitting (1323) an ACK message for the groupcast data packet using the first ACK communication resource responsive to successfully decoding the groupcast data packet.

4. The method of Embodiment 3, wherein the groupcast data packet is a first groupcast data packet, and wherein the distance is a first distance, the method further comprising:
  receiving (1313) a second groupcast data packet from the transmitting wireless device;
  determining (1315) a second distance of the receiving wireless device from the transmitting wireless device responsive to receiving the second groupcast data packet;
  selecting (1325) the first NACK communication resource for a NACK message for the second groupcast data packet responsive to failure decoding the second groupcast data packet based on the second distance from the transmitting wireless device being within the first range; and
  transmitting (1327) the NACK message for the second groupcast data packet using the first NACK communication resource responsive to failure decoding the groupcast data packet.

5. The method of Embodiment 2, wherein the groupcast data packet is a first groupcast data packet, wherein the transmitting wireless device is a first transmitting wireless device, and wherein the one of an ACK message or NACK message is a first ACK or NACK message, the method further comprising:
  receiving (1313) a second groupcast data packet from a second transmitting wireless device of the group;
  determining (1315) a distance of the receiving wireless device from the second transmitting wireless device;
  selecting (1321, 1325) from the second set of at least one communication resource for a second ACK or NACK message for the second groupcast data packet, wherein the second set is selected based on the distance from the second transmitting wireless device being within the second range; and
  transmitting (1323, 1327) the second ACK or NACK message for the second groupcast data packet using the second set of at least one communication resource selected based on the distance from the second transmitting device being in the second range.

6. The method of Embodiment 5, wherein the first set comprises a first ACK communication resource and a first NACK communication resource, and wherein the second set comprises a second ACK communication resource and a second NACK communication resource, wherein selecting from the second set comprises selecting (1321) the second ACK communication resource responsive to successfully decoding the second groupcast data packet based on the distance from the second transmitting wireless device being within the second range, and wherein transmitting comprises transmitting (1323) an ACK message for the second groupcast data packet using the second ACK communication resource responsive to successfully decoding the second groupcast data packet.

7. The method of Embodiment 6, the method further comprising:
  receiving (1313) a third groupcast data packet from the second transmitting wireless device of the group;
  determining (1315) a second distance of the receiving wireless device from the second transmitting wireless device;
  selecting (1325) the second NACK communication resource for a NACK message for the third groupcast data packet responsive to failure decoding the third groupcast data packet based on the second distance from the second transmitting wireless device being within the second range; and
  transmitting (1327) the NACK message for the third groupcast data packet using the second NACK communication resource responsive to failure decoding the third groupcast data packet.

8. The method of any of Embodiments 2-7 further comprising:
  establishing (1305) the group, wherein establishing the group includes receiving a destination group identification, ID, and wherein the destination group ID is included in the groupcast data packet or in control information associated with the groupcast data packet.

9. The method of Embodiment 8, wherein establishing the group includes receiving information used to define the first and second ranges of distances and the first and second sets of communication resources.

10. The method of any of Embodiments 2-8, wherein the first and second ranges of distances and the first and second sets are defined based on control information received from the transmitting wireless device.

11. The method of Embodiment 10, wherein the control information received from the transmitting wireless device comprises using at least one of sidelink control information, SCI, a medium access control element, MAC CE, and/or radio resource control, RRC, information.

12. The method of any of Embodiments 2-8, wherein the first and second ranges of distances and the first and second sets of communication resources are defined based on information received from a node of a wireless communication network.

13. The method of any of Embodiments 2-12, wherein the first and second ranges of distances are non-overlapping, wherein the first set of at least one communication resource and the second set of at least one communication resource are different, and wherein the first and second sets are non-overlapping.

14. The method of any of Embodiments 1-2, wherein the groupcast data packet is a first groupcast data packet, and wherein transmitting comprises transmitting an ACK message for the first groupcast data packet responsive to successfully decoding the first groupcast data packet, the method further comprising:
  receiving a second groupcast data packet; and
  refraining from transmission of a NACK message for the second groupcast data packet responsive to failure decoding the second groupcast data packet.

15. The method of any of Embodiments 1-2, wherein the groupcast data packet is a first groupcast data packet, and wherein transmitting comprises transmitting a NACK message for the first groupcast data packet responsive to failure decoding the first groupcast data packet, the method further comprising:
  receiving a second groupcast data packet; and
  refraining from transmission of an ACK message for the second groupcast data packet responsive to successfully decoding the second groupcast data packet.

16. The method of Embodiment 2 wherein transmitting (1323, 1327) the one of the ACK message or NACK message for the groupcast data packet using the communication resource selected based on the distance from the transmitting wireless device comprises:
  transmitting an ACK message responsive to successfully decoding the groupcast data packet and responsive to the distance being within the first range of distances (1601) from the transmitting wireless device;
  refraining from transmission of a NACK message responsive to failure decoding the groupcast data packet and responsive to the distance being within the first range of distances (1601) from the transmitting wireless device;
  transmitting a NACK message responsive to failure decoding the groupcast data packet and responsive to the distance being within the second range of distances (1603) from the transmitting wireless device;
  refraining from transmission of an ACK message responsive to successfully decoding the groupcast data packet and responsive to the distance being within the second range of distances (1603) from the transmitting wireless device.

17. The method of any of Embodiments 1-16, wherein determining the distance comprises determining the distance of the receiving wireless device from the transmitting wireless device based on location information received from the transmitting wireless device.

18. The method of any of Embodiments 1-17, wherein the communication resource is defined by at least one of a time resource, a frequency resource, and/or a code resource.

19. The method of any of Embodiments 1-18, wherein the transmitting wireless device is one of a plurality of other wireless devices of the group.

20. A receiving wireless device (1100) comprising:
  a processor (1103); and
  memory (1105) coupled with the processor, wherein the memory includes instructions that when executed by the processor causes the receiving wireless device to perform operations according to any of Embodiments 1-19.

21. A receiving wireless device (1000) wherein the receiving wireless device is adapted to perform according to any of Embodiments 1-19.

22. A computer program comprising program code to be executed by at least one processor (1103) of a receiving wireless device (1100), whereby execution of the program code causes the receiving wireless device (1100) to perform a method according to any of Embodiments 1-19.

23. A computer program product comprising a non-transitory storage medium including program code to be executed by at least one processor (1103) of a receiving wireless device (1100), whereby execution of the program code causes the receiving wireless device (1100) to perform a method according to any of Embodiments 1-19.

24. A method of operating a transmitting wireless device (1100) associated with a group, wherein the group includes the transmitting wireless device and a plurality of other wireless devices, the method comprising:
- transmitting (1701) a groupcast data packet to the plurality of other wireless devices of the group;
- determining (1703) a power/energy of at least one acknowledgment, ACK, message and/or negative acknowledgement, NACK, message received in response to the groupcast data packet; and
- determining (1705) a transmission based on the power/energy of the at least one ACK message and/or NACK message.

25. The method of Embodiment 24, wherein determining the transmission comprises performing the transmission using a modulation and coding scheme, MCS, determined based on the power/energy of the at least one ACK message and/or NACK message, and/or using a transmission power determined based on the power/energy of the at least one ACK message and/or NACK message.

26. The method of any of Embodiments 24-25 wherein determining the transmission comprises performing the transmission using a modulation and coding scheme, MCS, determined based on the power/energy of the at least one ACK message and/or NACK message and on a channel busy ratio (CBR) and/or transmission requirements, and/or using a transmission power determined based on the power/energy of the at least one ACK message and/or NACK message and on the CBR and/or transmission requirements.

27. The method of any of Embodiments 24-26, wherein respective ACK and NACK communication resources are provided for the groupcast data packet, wherein determining the power/energy comprises determining a combined power/energy received over the ACK communication resource for the groupcast data packet and determining a combined power/energy received over the NACK communication resource for the groupcast data packet.

28. The method of Embodiment 27, wherein the groupcast data packet is a first groupcast data packet, wherein determining a transmission comprises determining a reduced modulation and coding scheme and/or increased power responsive to a ratio or difference between the combined power/energy received over the ACK communication resource and the combined power/energy received over the NACK communication resource being less than a threshold, the method further comprising:
- transmitting a second groupcast data packet to the plurality of other wireless devices of the group using the reduced MCS and/or increased power responsive to the ratio or difference being less than the threshold.

29. The method of Embodiment 27, wherein the groupcast data packet is a first groupcast data packet, wherein determining a transmission comprises determining an increased modulation and coding scheme and/or reduced power responsive to a ratio or difference between the combined power/energy received over the ACK communication resource and the combined power/energy received over the NACK communication resource being greater than a threshold, the method further comprising:
- transmitting a second groupcast data packet to the plurality of other wireless devices of the group using the increased MCS and/or reduced power responsive to the ratio or difference being greater than the threshold.

30. The method of Embodiment 27, wherein the groupcast data packet is a first groupcast data packet, wherein determining a transmission comprises maintaining a previous modulation and coding scheme and/or a previous power responsive to a ratio or difference between the combined power/energy received over the ACK communication resource and the combined power/energy received over the NACK communication resource being greater than a threshold, the method further comprising:
- transmitting a second groupcast data packet to the plurality of other wireless devices of the group using the previous MCS and/or previous power responsive to the ratio or difference being greater than the threshold.

31. The method of any of Embodiments 28-30, wherein the threshold is one of a plurality of thresholds used for comparison with the ratio or difference, and wherein each threshold corresponds to a different MCS adaptation and/or a different power level and/or a different transmission power adaptation.

32. The method of Embodiment 32 wherein the plurality of thresholds is one of pre-configured or configured by a network node.

33. The method of any of Embodiments 27-32, wherein the a plurality of ACK communication resources and a plurality of NACK communication resources are provided for the groupcast data packet, wherein determining the combined power/energy received over the ACK communication resource comprises determining a combined power/energy received over the plurality of ACK communication resources for the groupcast data packet, and wherein determining the combined power/energy received over the NACK communication resource comprises determining a combined power/energy received over the plurality of ACK communication resources for the groupcast data packet.

34. The method of any of Embodiments 27-33, wherein transmitting the second groupcast data packet comprises retransmitting the first groupcast data packet.

35. The method of Embodiment 24, wherein a plurality of ranges of distances are associated with respective pluralities of ACK and NACK communication resources for the groupcast data packet, wherein determining the power/energy comprises determining combined powers/energies received over the plurality of ACK communication resources for the groupcast data packet and over the plurality of NACK communication resources for the groupcasts data packet.

36. The method of Embodiment 35, wherein determining combined powers/energies received over the plurality of ACK communication resources comprises applying different weightings to powers/energies received over at least two of the plurality of ACK communication resources, and/or wherein determining combined powers/energies received over the plurality of NACK communication resources comprises applying different weightings to powers/energies received over at least two of the plurality of NACK communication resources.

37. The method of any of Embodiments 35-36, wherein the groupcast data packet is a first groupcast data packet, wherein determining a transmission comprises determining a reduced modulation and coding scheme and/or increased power responsive to a ratio or difference between the combined power/energy received over the plurality of ACK communication resources and the combined power/energy received over the plurality of NACK communication resources being less than a threshold, the method further comprising:
- transmitting a second groupcast data packet to the plurality of other wireless devices of the group using the reduced MCS and/or increased power responsive to the ratio or difference being less than the threshold.

38. The method of any of Embodiments 35-36, wherein the groupcast data packet is a first groupcast data packet, wherein determining a transmission comprises determining an increased modulation and coding scheme and/or reduced power responsive to a ratio or difference between the combined power/energy received over the plurality of ACK communication resources and the combined power/energy received over the plurality of NACK communication resources being greater than a threshold, the method further comprising:
    transmitting a second groupcast data packet to the plurality of other wireless devices of the group using the increased MCS and/or reduced power responsive to the ratio or difference being greater than the threshold.

39. The method of any of Embodiments 35-36, wherein the groupcast data packet is a first groupcast data packet, wherein determining a transmission comprises maintaining a previous modulation and coding scheme and/or maintaining a previous power responsive to a ratio or difference between the combined power/energy received over the plurality of ACK communication resources and the combined power/energy received over the plurality of NACK communication resources being greater than a threshold, the method further comprising:
    transmitting a second groupcast data packet to the plurality of other wireless devices of the group using the previous MCS and/or previous power responsive the ratio or difference being greater than the threshold.

40. The method of any of Embodiments 35-39, wherein transmitting the second groupcast data packet comprises retransmitting the first groupcast data packet.

41. The method of Embodiment 40 wherein determining the transmission further comprises determining the transmission based on a channel busy ratio (CBR) and/or transmission requirements.

42. The method of any of Embodiments 35-41, wherein determining the transmission comprises determining whether to retransmit the groupcast data packet based on the combined powers/energies received over the plurality of ACK communication resources for the groupcast data packet and over the plurality of NACK communication resources for the groupcasts data packet.

43. The method of Embodiment 42 further comprising:
    retransmitting the groupcast data packet based on the combined powers/energies received over the pluralities of ACK and NACK communication resources for the groupcast data packet.

44. The method of any of Embodiments 35-43 further comprising:
    establishing (1305) the group, wherein establishing the group includes establishing a destination group identification, ID, and wherein the destination group identification is included in the groupcast data packet or in control information associated with the groupcast data packet.

45. The method of Embodiment 44, wherein establishing the group includes providing information used to define the plurality of ranges of distances and the pluralities of ACK and NACK communication resources.

46. The method of any of Embodiments 35-44, wherein information used to define the plurality of ranges of distances and the pluralities of ACK and NACK communication resources are transmitted to other wireless devices of the group using control information.

47. The method of Embodiment 46, wherein the control information is transmitted as at least one of sidelink control information, SCI, a medium access control element, MAC CE, and/or radio resource control, RRC, information.

48. The method of any of Embodiments 35-45, wherein information used to define the plurality of ranges of distances and the pluralities of ACK and NACK communication resources are configured at the transmitting wireless device based on information received from a wireless communication network.

49. The method of any of Embodiments 24-48 further comprising:
    establishing (1305) the group, wherein establishing the group includes establishing a destination group identification, ID, and wherein the destination group identification is included in the groupcast data packet or in control information associated with the groupcast data packet.

50. The method of Embodiment 49, wherein establishing the group includes providing information used to define the ACK and NACK communication resources.

51. The method of any of Embodiments 27-50, wherein information used to define the ACK and NACK communication resources is transmitted to other wireless devices of the group using control information.

52. The method of Embodiment 51, wherein the control information is transmitted as at least one of sidelink control information, SCI, a medium access control element, MAC CE, and/or radio resource control, RRC, information.

53. The method of any of Embodiments 27-51, wherein information used to define the ACK and NACK communication resources is configured at the transmitting wireless device based on information received from a wireless communication network.

54. The method of any of Embodiments 24-25, wherein determining the power/energy comprises determining a power/energy of at least one ACK message, and wherein determining the transmission comprises determining the transmission based on the power/energy of the at least one ACK message.

55. The method of Embodiment 54, wherein the at least one ACK message comprises a plurality of ACK messages received using a plurality of ACK communication resources, wherein determining the power/energy comprises determining a combined power/energy of the plurality of ACK messages received using the plurality of ACK communication resources, and wherein determining the transmission comprises determining the transmission based on the combined power/energy.

56. The method of Embodiment 55, wherein determining combined powers/energies received over the plurality of ACK communication resources comprises applying different weightings to powers/energies received over at least two of the plurality of ACK communication resources, and/or wherein determining combined powers/energies received over the plurality of NACK communication resources comprises applying different weightings to powers/energies received over at least two of the plurality of NACK communication resources.

57. The method of any of Embodiments 24-25, wherein determining the power/energy comprises determining a power/energy of at least one NACK message, and wherein determining the transmission comprises determining the transmission based on the power/energy of the at least one NACK message.

58. The method of Embodiment 57, wherein the at least one NACK message comprises a plurality of NACK messages received using a plurality of NACK communication resources, wherein determining the power/energy comprises determining a combined power/energy of the plurality of NACK messages received using the plurality of NACK communication resources, and wherein determining the transmission comprises determining the transmission based on the combined power/energy.

59. The method of Embodiment 58, wherein determining combined powers/energies received over the plurality of NACK communication resources comprises applying different weightings to powers/energies received over at least two of the plurality of NACK communication resources.

60. A transmitting wireless device (1100) comprising:
a processor (1103); and
memory (1105) coupled with the processor, wherein the memory includes instructions that when executed by the processor causes the transmitting wireless device to perform operations according to any of Embodiments 24-59.

61. A transmitting wireless device (1100) wherein the transmitting wireless device is adapted to perform according to any of Embodiments 24-59.

62 A computer program comprising program code to be executed by at least one processor (1103) of a transmitting wireless device (1100), whereby execution of the program code causes the transmitting wireless device (1100) to perform a method according to any of Embodiments 24-59.

63. A computer program product comprising a non-transitory storage medium including program code to be executed by at least one processor (1103) of a transmitting wireless device (1100), whereby execution of the program code causes the transmitting wireless device (1100) to perform a method according to any of Embodiments 24-59.

Explanations for abbreviations from the above disclosure are provided below.

| Abbreviation | Explanation |
| --- | --- |
| ACK | Acknowledgement |
| AGC | Automatic gain control |
| BSM | Basic Safety Message |
| CAM | Cooperative awareness message |
| CBR | Channel busy ratio |
| D2D | Device-to-device communication |
| DENM | Decentralized Environmental Notification Message |
| HARQ | Hybrid automatic repeat request |
| KPI | Key performance identifier |
| LTE | Long-term evolution |
| MCS | Modulation and coding scheme |
| NACK | Negative acknowledgement |
| NR | New radio |
| NW | Network |
| OFDM | Orthogonal frequency division multiplexing |
| ProSe | Proximity-based services |
| PSCCH | Physical sidelink control channel |
| PSSCH | Physical sidelink shared channel |
| QoS | Quality of Service |
| RSRP | Received Signal Receive Power |
| RSSI | Received Signal Strength Indicator |
| SAE | Society of Automotive Engineers |
| SFN | Single-frequency Network |
| SCI | Sidelink control information |
| V2I | Vehicle-to-infrastructure |
| V2P | Vehicle-to-pedestrian |
| V2V | Vehicle-to-vehicle |
| V2X | Vehicle-to-anything communication |

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional Explanation is Provided Below

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 18:
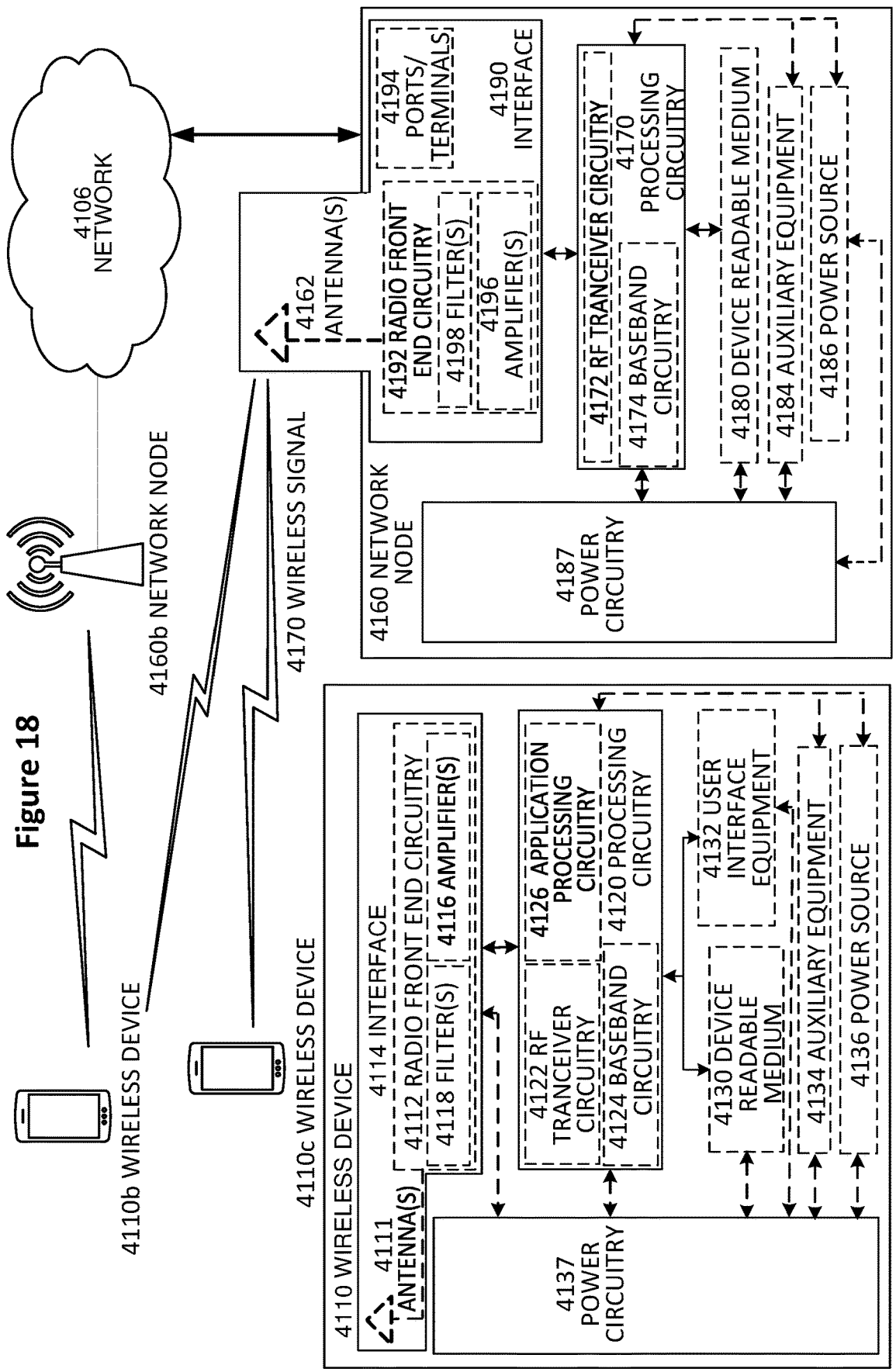
FIG. 18 is a block diagram of a wireless network in accordance with some embodiments.

FIG. 18: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 18. For simplicity, the wireless network of FIG. 18 only depicts network 4106, network nodes 4160 and 4160*b*, and WDs 4110, 4110*b*, and 4110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 18, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 18 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units.

In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4190 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 18 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4114 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated. User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 19:
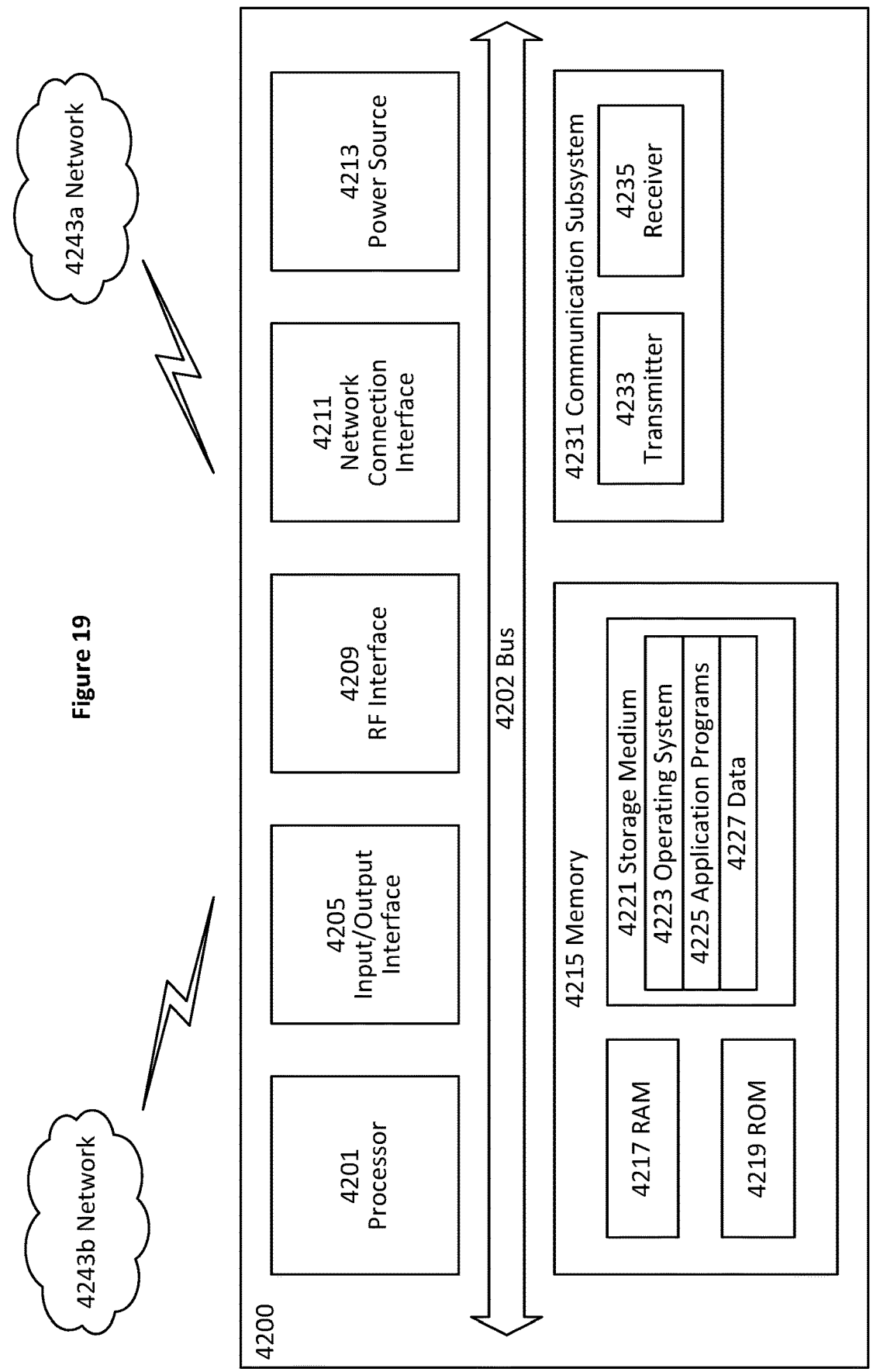
FIG. 19 is a block diagram of a user equipment in accordance with some embodiments

FIG. 19: User Equipment in accordance with some embodiments

FIG. 19 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 4200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 19, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 19 is a UE, the components discussed herein are equally applicable to a WD, and vice-versa.

In FIG. 19, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4233, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 19, or only a subset of the components. The level of integration between the components may vary from one UE to another UE. Further, certain UEs may contain multiple instances of a component, such as multiple processors, memories, transceivers, transmitters, receivers, etc.

In FIG. 19, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 19, RF interface 4209 may be configured to provide a communication interface to RF components such as a transmitter, a receiver, and an antenna. Network connection interface 4211 may be configured to provide a communication interface to network 4243a. Network 4243a may encompass wired and/or wireless networks such as a local-area network (LAN), a wide-area network (WAN), a computer network, a wireless network, a telecommunications network, another like network or any combination thereof. For example, network 4243a may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 19, processing circuitry 4201 may be configured to communicate with network 4243b using communication subsystem 4231. Network 4243a and network 4243b may be the same network or networks or different network or networks. Communication subsystem 4231 may be configured to include one or more transceivers used to communicate with network 4243b. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.42, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243b may encompass wired and/or wireless networks such as a local-area network (LAN), a wide-area network (WAN), a computer network, a wireless network, a telecommunications network, another like network or any combination thereof. For example, network 4243b may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 20:
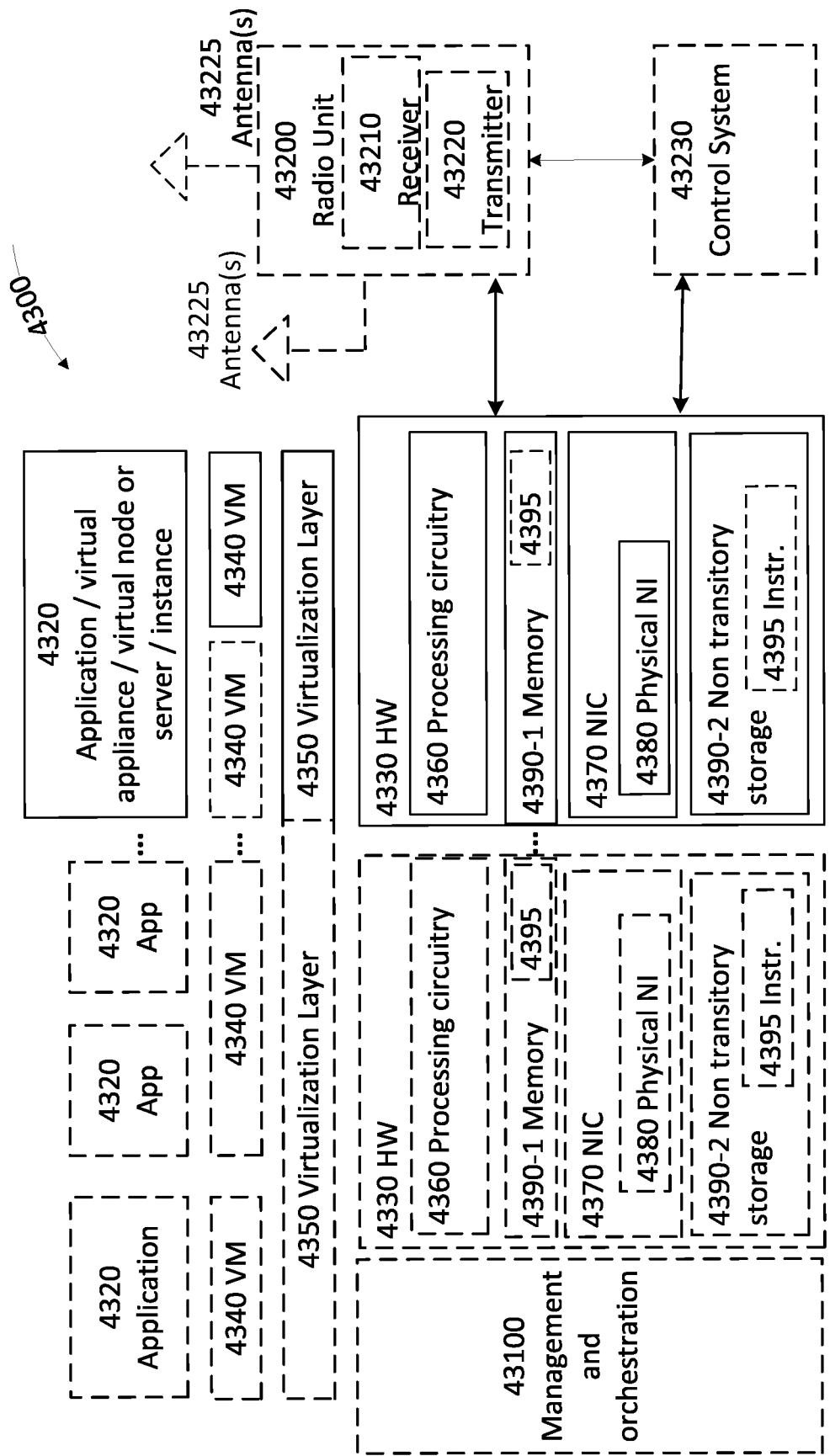
FIG. 20 is a block diagram of a virtualization environment in accordance with some embodiments.

FIG. 20: Virtualization environment in accordance with some embodiments

FIG. 20 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340, comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 20, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 20.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 21:
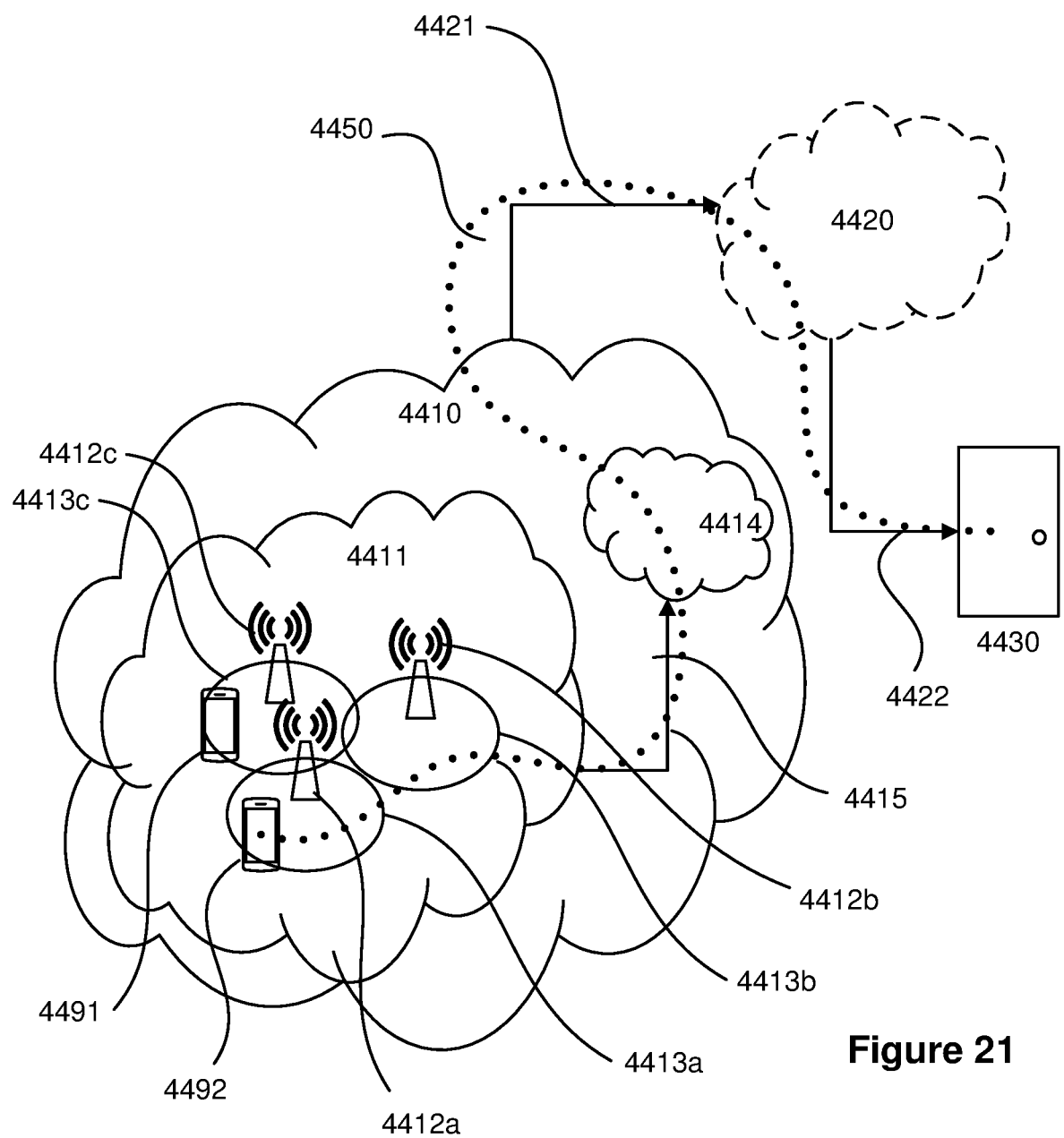
FIG. 21 is a block diagram of a telecommunication network connected via an intermediate network to a host computer in accordance with some embodiments.

FIG. 21: Telecommunication network connected via an intermediate network to a host computer in accordance with some embodiments.

With reference to FIG. 21, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 21 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 22:
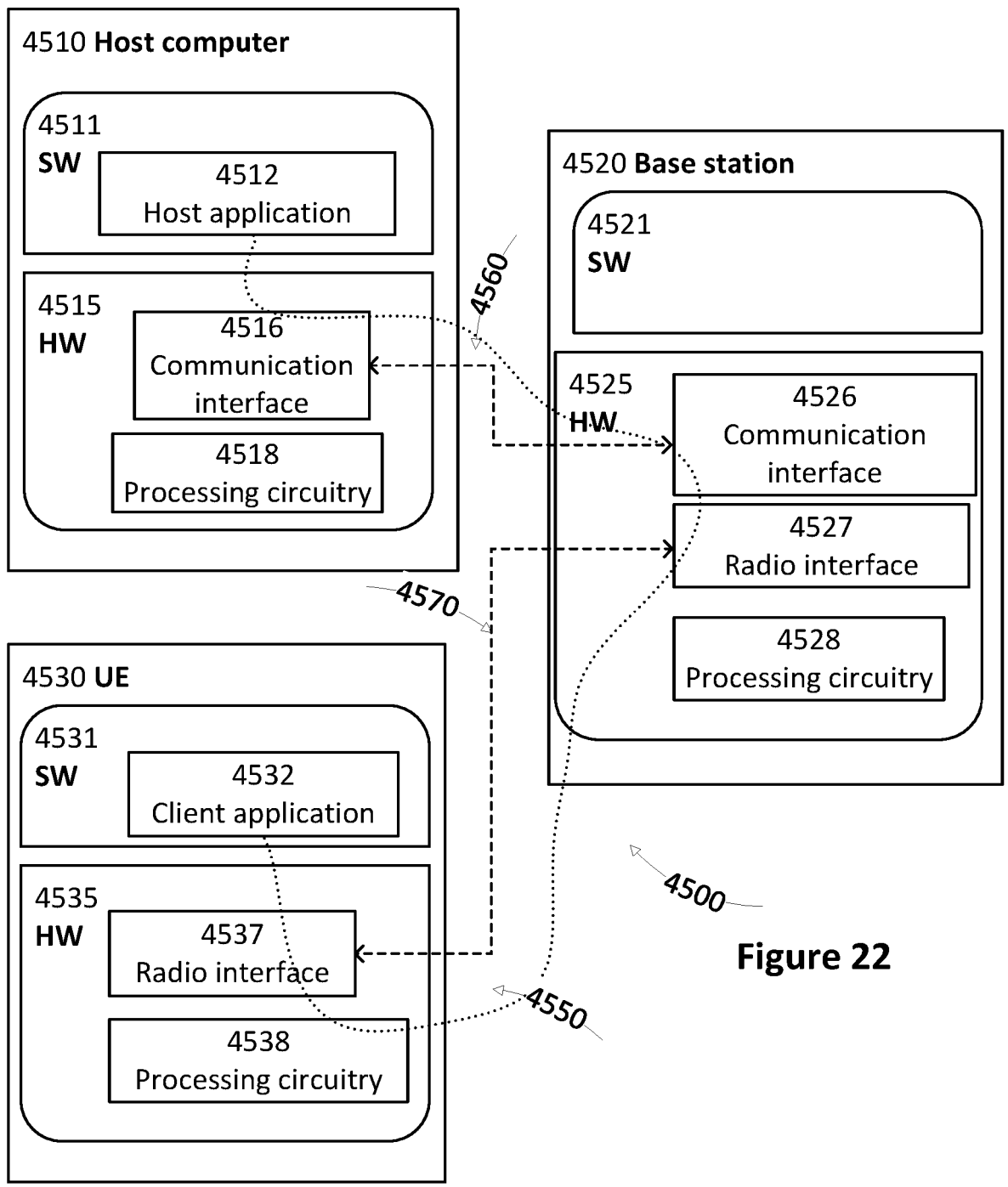
FIG. 22 is a block diagram of a host computer communicating via a base station with a user equipment over a partially wireless connection in accordance with some embodiments.

FIG. 22: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 22. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 22) served by base station 4520. Communication interface 4526 may be configured to facilitate connection 4560 to host computer 4510. Connection 4560 may be direct or it may pass through a core network (not shown in FIG. 22) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 22 may be similar or identical to host computer 4430, one of base stations 4412*a*, 4412*b*, 4412*c* and one of UEs 4491, 4492 of FIG. 21, respectively. This is to say, the inner workings of these entities may be as shown in FIG. 22 and independently, the surrounding network topology may be that of FIG. 21.

In FIG. 22, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figure 23:
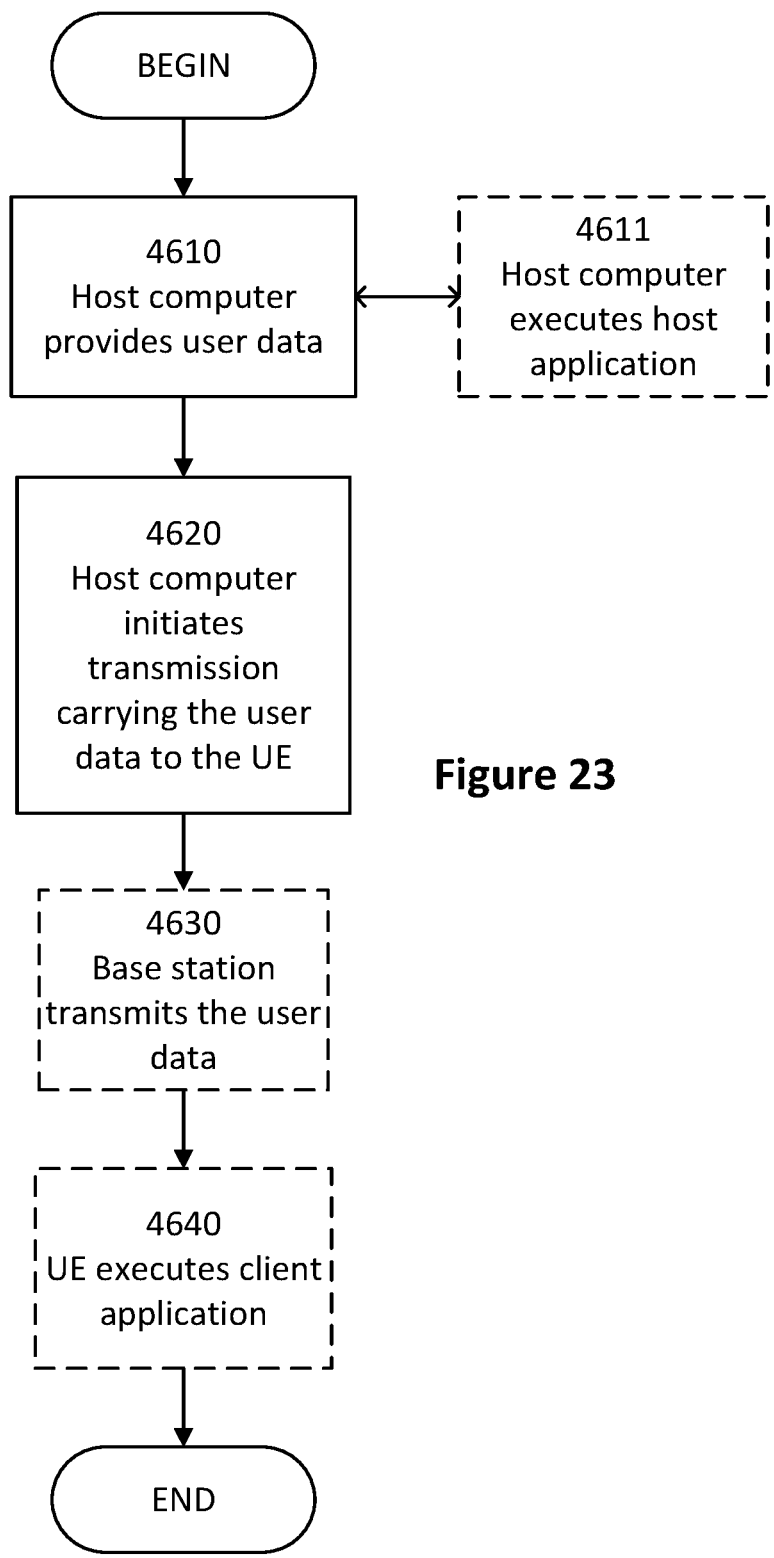
FIG. 23 is a block diagram of methods implemented in a communication system including a host computer, a base station and a user equipment in accordance with some embodiments.

FIG. 23: Methods implemented in a communication system including a host computer, a base station and a user equipment in accordance with some embodiments.

FIG. 23 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 23 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 24:
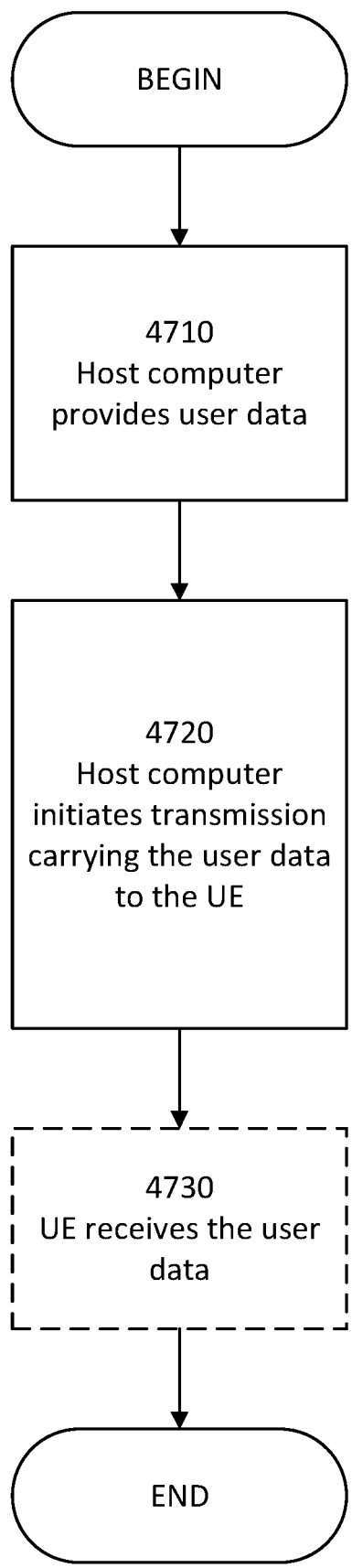
FIG. 24 is a block diagram of methods implemented in a communication system including a host computer, a base station and a user equipment in accordance with some embodiments.

FIG. 24: Methods implemented in a communication system including a host computer, a base station and a user equipment in accordance with some embodiments.

FIG. 24 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 24 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figure 25:
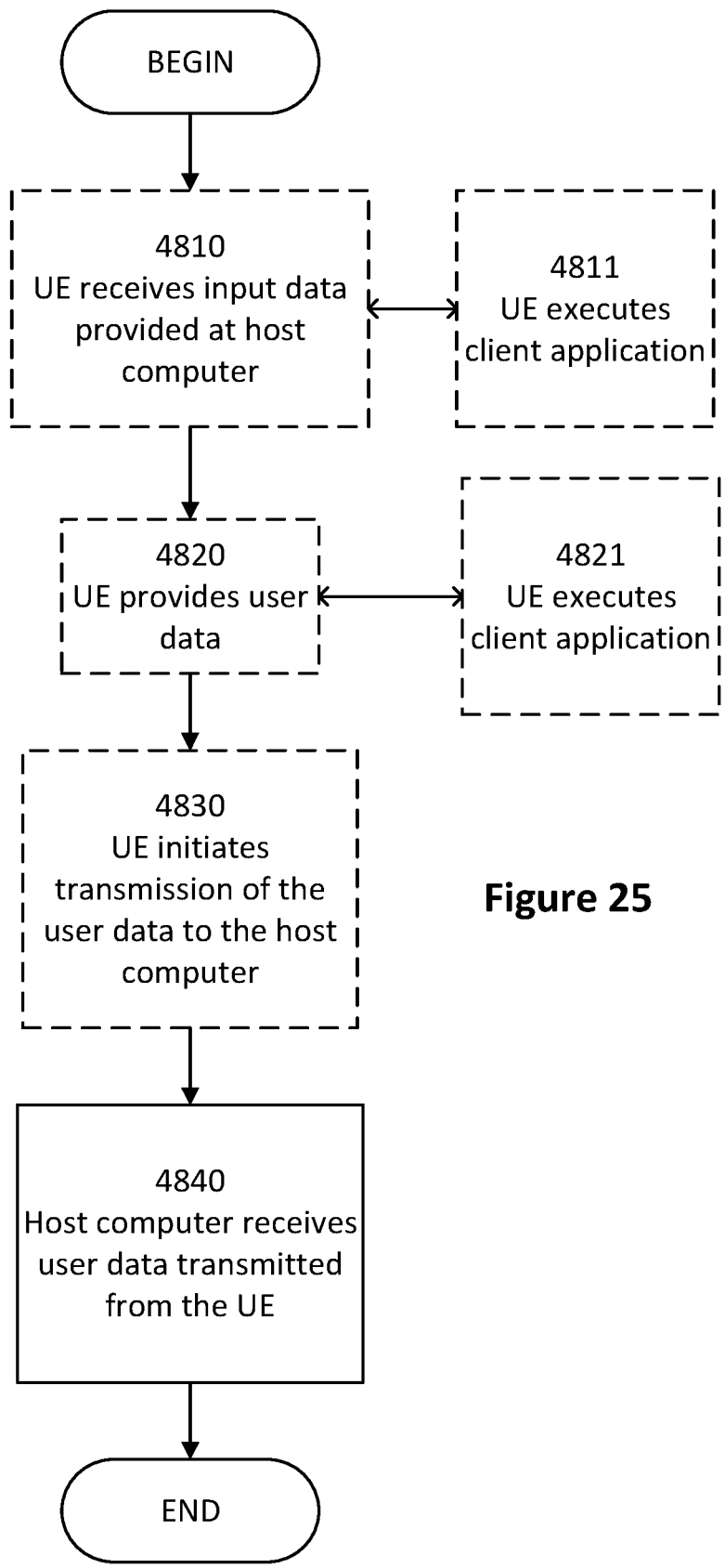
FIG. 25 is a block diagram of methods implemented in a communication system including a host computer, a base station and a user equipment in accordance with some embodiments.

FIG. 25: Methods implemented in a communication system including a host computer, a base station and a user equipment in accordance with some embodiments.

FIG. 25 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 25 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional)

of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

Figure 26:
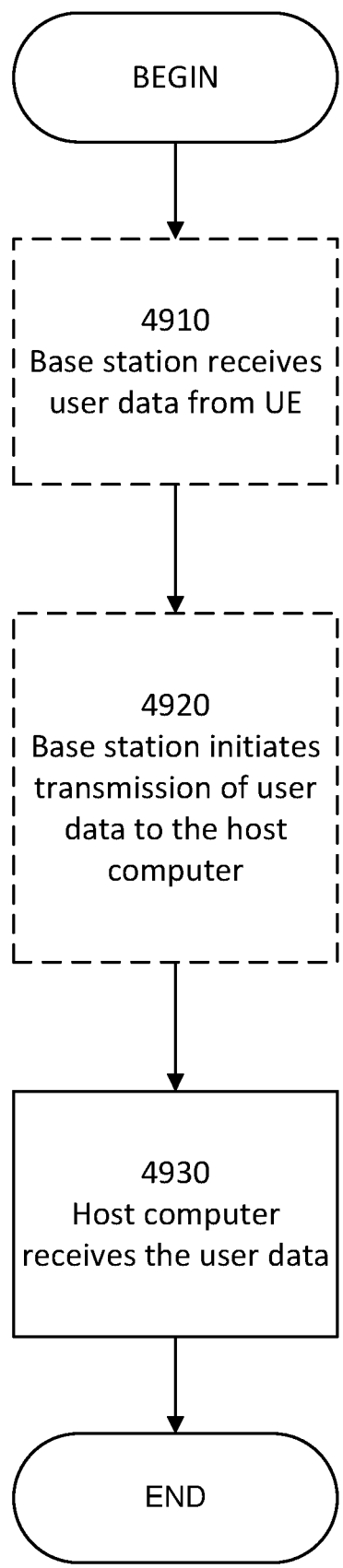
FIG. 26 is a block diagram of methods implemented in a communication system including a host computer, a base station and a user equipment in accordance with some embodiments.

FIG. 26: Methods implemented in a communication system including a host computer, a base station and a user equipment in accordance with some embodiments.

FIG. 26 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 26 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method of operating a transmitting wireless device associated with a group, wherein the group includes the transmitting wireless device and a plurality of other wireless devices, the method comprising:
   transmitting a groupcast data packet to the plurality of other wireless devices of the group;
   determining a power/energy of at least one Hybrid Automatic Repeat Request (HARQ) feedback message received in response to the groupcast data packet, wherein respective positive acknowledgment (ACK) and negative acknowledgment (NACK) communication resources are provided for HARQ feedback of the groupcast data packet, and determining the power/energy comprises determining a combined power/energy received from some of the plurality of other wireless devices of the group over the ACK communication resource for the groupcast data packet and determining a combined power/energy received from other of the plurality of other wireless devices of the group over the NACK communication resource for the groupcast data packet; and
   adjusting a transmission comprising performing the transmission using a modulation and coding scheme (MCS) and adjusting the MCS based on the power/energy of the at least one HARQ feedback message.

2. The method of claim 1, wherein adjusting the transmission comprises performing the transmission using a transmission power determined based on the power/energy of the at least one HARQ feedback message.

3. The method of claim 1 wherein adjusting the transmission comprises performing the transmission using the MCS determined based on the power/energy of the at least one HARQ feedback message and on a channel busy ratio (CBR) and/or transmission requirements, and/or using a transmission power determined based on the power/energy of the at least one HARQ feedback message and on the CBR and/or transmission requirements.

4. The method of claim 1, wherein the groupcast data packet is a first groupcast data packet, wherein adjusting the transmission comprises adjusting the MCS by determining a reduced MCS and/or increased power responsive to a ratio or difference between the combined power/energy received over the ACK communication resource and the combined power/energy received over the NACK communication resource being less than a threshold, the method further comprising:
   transmitting a second groupcast data packet to the plurality of other wireless devices of the group using the reduced MCS and/or increased power responsive to the ratio or difference being less than the threshold.

5. The method of claim 1, wherein the groupcast data packet is a first groupcast data packet, wherein adjusting the transmission comprises adjusting the MCS by determining an increased MCS and/or reduced power responsive to a ratio or difference between the combined power/energy received over the ACK communication resource and the combined power/energy received over the NACK communication resource being greater than a threshold, the method further comprising:
   transmitting a second groupcast data packet to the plurality of other wireless devices of the group using the increased MCS and/or reduced power responsive to the ratio or difference being greater than the threshold.

6. The method of claim 1, wherein a plurality of ACK communication resources and a plurality of NACK communication resources are provided for the groupcast data packet, wherein determining the combined power/energy received over the ACK communication resource comprises determining a combined power/energy received over the plurality of ACK communication resources for the groupcast data packet, and wherein determining the combined power/energy received over the NACK communication resource comprises determining a combined power/energy received over the plurality of ACK communication resources for the groupcast data packet.

7. The method of claim 1, wherein a plurality of ranges of distances from the transmitting wireless device are associated with respective pluralities of positive acknowledgment (ACK) and negative acknowledgment (NACK) communication resources for the groupcast data packet.

8. The method of claim 7, further comprising providing information used to define the plurality of ranges of distances and the pluralities of ACK and NACK communication resources to the plurality of other wireless devices of the group using control information.

9. The method of claim 8, wherein the information used to define the plurality of ranges of distances and the pluralities of ACK and NACK communication resources are configured at the transmitting wireless device based on information received from a wireless communication network.

10. The method of claim 8, wherein the control information is transmitted or received using at least one of Sidelink Control Information (SCI), a Medium Access Control Element (MAC CE), and/or Radio Resource Control (RRC) information.

11. The method of claim 1, configuring the groupcast data packet to include a destination group identifier for the other wireless devices of the group in proximity to the transmitting wireless device.

12. A transmitting wireless device comprising:
a processor; and
memory coupled with the processor, wherein the memory includes instructions that when executed by the processor causes the transmitting wireless device to perform operations comprising:
transmitting a groupcast data packet to the plurality of other wireless devices of the group;
determining a power/energy of at least one Hybrid Automatic Repeat Request (HARQ) feedback message received in response to the groupcast data packet, wherein respective positive acknowledgment (ACK) and negative acknowledgment (NACK) communication resources are provided for HARQ feedback of the groupcast data packet, wherein determining the power/energy comprises determining a combined power/energy received over the ACK communication resource for the groupcast data packet and determining a combined power/energy received over the NACK communication resource for the groupcast data packet; and
adjusting a transmission comprising performing the transmission using a modulation and coding scheme (MCS) and adjusting the MCS based on the power/energy of the at least one HARQ feedback message.

13. The transmitting wireless device of claim 12, wherein adjusting the transmission comprises performing the transmission using the MCS determined based on the power/energy of the at least one HARQ feedback message, and/or using a transmission power determined based on the power/energy of the at least one HARQ feedback message.

14. The transmitting wireless device of claim 12 wherein adjusting the transmission comprises performing the transmission using the MCS determined based on the power/energy of the at least one HARQ feedback message and on a channel busy ratio (CBR) and/or transmission requirements, and/or using a transmission power determined based on the power/energy of the at least one HARQ feedback message and on the CBR and/or transmission requirements.

15. The transmitting wireless device of claim 12, wherein the groupcast data packet is a first groupcast data packet, wherein adjusting the transmission comprises adjusting the MCS by determining a reduced MCS and/or increased power responsive to a ratio or difference between the combined power/energy received over the ACK communication resource and the combined power/energy received over the NACK communication resource being less than a threshold, wherein the memory includes instructions that when executed by the processor causes the transmitting wireless device to perform operations further comprising:
transmitting a second groupcast data packet to the plurality of other wireless devices of the group using the reduced MCS and/or increased power responsive to the ratio or difference being less than the threshold.

16. The transmitting wireless device of claim 12, wherein the groupcast data packet is a first groupcast data packet, wherein adjusting the transmission comprises adjusting the MCS by determining an increased MCS and/or reduced power responsive to a ratio or difference between the combined power/energy received over the ACK communication resource and the combined power/energy received over the NACK communication resource being greater than a threshold, wherein the memory includes instructions that when executed by the processor causes the transmitting wireless device to perform operations further comprising:
transmitting a second groupcast data packet to the plurality of other wireless devices of the group using the increased MCS and/or reduced power responsive to the ratio or difference being greater than the threshold.

17. The transmitting wireless device of claim 12, wherein a plurality of ranges of distances are associated with respective pluralities of positive acknowledgment (ACK) and negative acknowledgment (NACK) communication resources for the groupcast data packet.

18. The transmitting wireless device of claim 17, further comprising providing information used to define the plurality of ranges of distances and the pluralities of ACK and NACK communication resources to the plurality of other wireless devices of the group using control information.

19. The transmitting wireless device of claim 12, wherein a plurality of ACK communication resources and a plurality of NACK communication resources are provided for the groupcast data packet, wherein determining the combined power/energy received over the ACK communication resource comprises determining a combined power/energy received over the plurality of ACK communication resources for the groupcast data packet, and wherein determining the combined power/energy received over the NACK communication resource comprises determining a combined power/energy received over the plurality of ACK communication resources for the groupcast data packet.

20. A computer program comprising a non-transitory storage medium including program code to be executed by at least one processor of a transmitting wireless device, whereby execution of the program code causes the transmitting wireless device to perform operations comprising:
transmitting a groupcast data packet to the plurality of other wireless devices of the group;
determining a power/energy of at least one Hybrid Automatic Repeat Request (HARQ) feedback message received in response to the groupcast data packet, wherein respective positive acknowledgment (ACK) and negative acknowledgment (NACK) communication resources are provided for HARQ feedback of the groupcast data packet, wherein determining the power/energy comprises determining a combined power/energy received over the ACK communication resource for the groupcast data packet and determining a combined power/energy received over the NACK communication resource for the groupcast data packet; and
adjusting a transmission comprising performing the transmission using a modulation and coding scheme (MCS) and adjusting the MCS based on the power/energy of the at least one HARQ feedback message.

* * * * *